(12) United States Patent
Kawanishi

(10) Patent No.: US 11,473,704 B2
(45) Date of Patent: Oct. 18, 2022

(54) PIPE DETACHMENT PREVENTING DEVICE FOR UNION NUT PIPE FITTING

(71) Applicant: SK-KAWANISHI CO., LTD., Kagawa (JP)

(72) Inventor: Hidehito Kawanishi, Kagawa (JP)

(73) Assignee: SK-KAWANISHI CO., LTD., Kagawa (JP)

( * ) Notice: Subject to any disclaimer, the term of this patent is extended or adjusted under 35 U.S.C. 154(b) by 0 days.

(21) Appl. No.: 17/619,155

(22) PCT Filed: Oct. 30, 2020

(86) PCT No.: PCT/JP2020/040912
§ 371 (c)(1),
(2) Date: Dec. 14, 2021

(87) PCT Pub. No.: WO2021/085619
PCT Pub. Date: May 6, 2021

(65) Prior Publication Data
US 2022/0213991 A1   Jul. 7, 2022

(30) Foreign Application Priority Data

Oct. 31, 2019 (JP) .............................. JP2019-199437

(51) Int. Cl.
*F16L 27/12* (2006.01)
*F16L 21/08* (2006.01)
(Continued)

(52) U.S. Cl.
CPC ............... *F16L 21/08* (2013.01); *F16L 21/04* (2013.01); *F16L 27/12* (2013.01); *F16L 19/065* (2013.01)

(58) Field of Classification Search
CPC . F16L 19/065; F16L 19/0653; F16L 19/0656; F16L 21/08; F16L 21/04; F16L 27/00; F16L 27/12
(Continued)

(56) References Cited

U.S. PATENT DOCUMENTS

2015/0233506 A1\* 8/2015 Kim ...................... F16L 21/08
285/337

FOREIGN PATENT DOCUMENTS

JP    H08-247359 A    9/1996
JP    2003-214575 A   7/2003
(Continued)

OTHER PUBLICATIONS

International Search Report issued in Application No. PCT/JP2020/040912, dated Dec. 22, 2020.

*Primary Examiner* — Aaron M Dunwoody
(74) *Attorney, Agent, or Firm* — Michael Best & Friedrich LLP

(57) ABSTRACT

Provided is a pipe detachment preventing device, for a union nut pipe fitting, which can omit an inner core and which can prevent detachment of a pipe from a pipe fitting even when a large pulling force which stretches the pipe acts. Connection holding means (7) includes an inclination mechanism (8) configured to incline a retaining ring (4A) in a pipe axis direction (X) with respect to a reference plane (P) orthogonal to a central axis (C) of a retaining ring body (40), such that one of a circumferential center portion (40y) and a circumferential end portion (40x) of a retaining ring body (40A) is caused to be closer to a fitting body (2) and the other is moved away from the fitting body (2), when first protruding portions (41) and first facing portions (55) come into contact with each other and a pipe pulling force which stretches a joint pipe (100) is applied to the joint pipe (100).

14 Claims, 17 Drawing Sheets

(51) Int. Cl.
*F16L 21/04* (2006.01)
*F16L 19/065* (2006.01)

(58) Field of Classification Search
USPC .......................................... 285/114, 223, 249
See application file for complete search history.

(56) References Cited

FOREIGN PATENT DOCUMENTS

| | | | |
|---|---|---|---|
| JP | 2005-233379 | A | 9/2005 |
| JP | 2005-240910 | A | 9/2005 |
| JP | 2009-030761 | A | 2/2009 |
| JP | 2015-224673 | A | 12/2015 |
| WO | WO-2008/094576 | A1 | 8/2008 |

\* cited by examiner

PIPE DETACHMENT PREVENTING DEVICE FOR UNION NUT PIPE FITTING

TECHNICAL FIELD

The present invention relates to a pipe detachment preventing device for a union nut pipe fitting. More specifically, the present invention relates to a pipe detachment preventing device, for a union nut pipe fitting, which includes: a fitting body having a receiving portion which has an external thread formed on an outer peripheral surface thereof and into which a non-threaded joint pipe is inserted; a union nut screwed and tightened to the receiving portion with an annular rubber packing interposed therebetween; a retaining ring fixed to the outer peripheral surface of the joint pipe by reducing the diameter of a retaining ring body by tightening means; a locking tool detachably attached to the union nut; and connection holding means configured to hold connection between the locking tool and the retaining ring.

BACKGROUND ART

Conventionally, as a pipe detachment preventing device for a union nut pipe fitting as described above, for example, those described in PATENT DOCUMENTS 1 and 2 are known. In each of these pipe detachment preventing devices, as illustrated in FIG. 23, when a pulling force is generated in a pipe axis direction X at a joint pipe 100, a flat surface 4'b of a locking portion 4'a of a retaining ring 4' and a flat surface 5'b of an arm 5'a of a locking tool 5' come into contact with each other to oppose the pulling force. In addition, in the conventional pipe detachment preventing device, an inner core is inserted into the joint pipe, and the diameter of the retaining ring is reduced to cause a blade portion inside the retaining ring to bite into the joint pipe, so that the joint pipe is prevented from being detached from a fitting body even when being stretched. However, it is necessary to insert the inner core before connecting the fitting body of the union nut pipe fitting, which increases the production cost. Moreover, when a builder forgets to insert the inner core, if a large pulling force which stretches the joint pipe acts, the joint pipe may be detached from the fitting body.

CITATION LIST

Patent Documents

[PATENT DOCUMENT 1] Japanese Laid-Open Patent Publication No. 2005-233379
[PATENT DOCUMENT 2] Japanese Laid-Open Patent Publication No. 2009-30761

SUMMARY OF THE INVENTION

Problems to be Solved by the Invention

In view of such conventional circumstances, an object of the present invention is to provide a pipe detachment preventing device, for a union nut pipe fitting, which can omit an inner core and which can prevent detachment of a pipe from a pipe fitting even when a large pulling force which stretches the pipe acts.

Solution to the Problems

In order to achieve the above object, a feature of a pipe detachment preventing device for a union nut pipe fitting according to the present invention is that in a configuration of including: a fitting body having a receiving portion which has an external thread formed on an outer peripheral surface thereof and into which a non-threaded joint pipe is inserted; a union nut screwed and tightened to the receiving portion with an annular rubber packing interposed therebetween; a retaining ring fixed to an outer peripheral surface of the joint pipe by reducing a diameter of a retaining ring body by tightening means; a locking tool detachably attached to the union nut; and connection holding means configured to hold connection between the retaining ring and the locking tool, the retaining ring includes a pair of first protruding portions protruding outward from the retaining ring body, and a blade portion which is provided on an inner side of the retaining ring body and which bites into the joint pipe due to diameter reduction by the tightening means, the locking tool includes a pair of first facing portions which are provided at a pair of arm portions extending along an axial direction from a main body and which face the first protruding portions in a pipe axis direction, and the connection holding means includes an inclination mechanism configured to incline the retaining ring in the pipe axis direction with respect to a reference plane orthogonal to a central axis of the retaining ring body, such that one of a circumferential center portion or a circumferential end portion of the retaining ring body is caused to be closer to the fitting body and the other is moved away from the fitting body, when the first protruding portions and the first facing portions come into contact with each other and a pipe pulling force which stretches the joint pipe is applied to the joint pipe.

According to the above configuration, the pair of first facing portions of the locking tool face the pair of first protruding portions of the retaining ring in the pipe axis direction, and the connection holding means includes the pair of first protruding portions and the pair of first facing portions. The connection holding means includes the inclination mechanism configured to incline the retaining ring in the pipe axis direction with respect to the reference plane orthogonal to the central axis of the retaining ring body, such that one of the circumferential center portion and the circumferential end portion of the retaining ring body is caused to be closer to the fitting body and the other is moved away from the fitting body, when the first protruding portions and the first facing portions come into contact with each other and a pipe pulling force which stretches the joint pipe is applied to the joint pipe. When a pipe pulling force which stretches the joint pipe is applied to the joint pipe, the joint pipe is stretched and becomes thinner (reduced in diameter), and the biting of the blade portion of the retaining ring into the joint pipe becomes weaker, so that a state where it is easy to detach (pull out) the pipe is obtained. In this state, the inclination mechanism inclines the retaining ring in the pipe axis direction with respect to the reference plane orthogonal to the central axis of the retaining ring body, so that the retaining ring body bites into the joint pipe on the upper side and the lower side to deform (bend) the joint pipe. Moreover, since the joint pipe is reduced in diameter and the retaining ring is displaced and inclined when the joint pipe is stretched, the biting of the blade portion into the joint pipe is also maintained. Therefore, the biting of the retaining ring body and the blade portion into the pipe becomes a large resistance to the pipe pulling force, so that it is possible to prevent detachment of the pipe.

In this case, the inclination mechanism may include a first surface of each first protruding portion which faces the first facing portion, and a first surface of each first facing portion which faces said first surface, and either one of the first surfaces may be inclined in the pipe axis direction with respect to the reference plane.

Moreover, the inclination mechanism may include a first surface of each first protruding portion which faces the first facing portion, a first surface of each first facing portion which faces said first surface, and a contact member interposed between the first surface of each first protruding portion and the first surface of each first facing portion, and either one of contact surfaces of the contact member that comes into contact with one of the first surfaces may be inclined in the pipe axis direction with respect to the reference plane.

In order to achieve the above object, another feature of the pipe detachment preventing device for a union nut pipe fitting according to the present invention is that in a configuration of including: a fitting body having a receiving portion which has an external thread formed on an outer peripheral surface thereof and into which a non-threaded joint pipe is inserted; a union nut screwed and tightened to the receiving portion with an annular rubber packing interposed therebetween; a retaining ring fixed to an outer peripheral surface of the joint pipe by reducing a diameter of a retaining ring body by the tightening means; a locking tool detachably attached to the union nut; and connection holding means configured to hold connection between the retaining ring and the locking tool, the locking tool includes a pair of second protruding portions protruding inward at end portions of a pair of arm portions extending along a pipe axis direction from a main body, the retaining ring includes a pair of second facing portions which are provided on an outer peripheral surface of the retaining ring body and which face the second protruding portions, and a blade portion which is provided on an inner side of the retaining ring body and which bites into the joint pipe due to diameter reduction by the tightening means, and the connection holding means includes an inclination mechanism configured to incline the retaining ring in the pipe axis direction with respect to a reference plane orthogonal to a central axis of the retaining ring body, such that one of a circumferential center portion or a circumferential end portion of the retaining ring body is caused to be closer to the fitting body and the other is moved away from the fitting body, when the second protruding portions and the second facing portions come into contact with each other and a pipe pulling force which stretches the joint pipe is applied to the joint pipe.

According to the above configuration, the pair of second facing portions of the retaining ring face the pair of second protruding portions of the locking tool in the pipe axis direction, and the connection holding means includes the pair of second protruding portions and the pair of second facing portions. The connection holding means includes the inclination mechanism configured to incline the retaining ring in the pipe axis direction with respect to the reference plane orthogonal to the central axis of the retaining ring body, such that one of the circumferential center portion and the circumferential end portion of the retaining ring body is caused to be closer to the fitting body and the other is moved away from the fitting body, when the second protruding portions and the second facing portions come into contact with each other and a pipe pulling force which stretches the joint pipe is applied to the joint pipe. When a pipe pulling force which stretches the joint pipe is applied to the joint pipe, the joint pipe is stretched and becomes thinner (reduced in diameter), and the biting of the blade portion of the retaining ring into the joint pipe becomes weaker, so that a state where it is easy to detach (pull out) the pipe is obtained. In this state, the inclination mechanism inclines the retaining ring in the pipe axis direction with respect to the reference plane orthogonal to the central axis of the retaining ring body, so that the retaining ring body bites into the joint pipe on the upper side and the lower side to deform (bend) the joint pipe. Moreover, since the joint pipe is reduced in diameter and the retaining ring is displaced and inclined when the joint pipe is stretched, the biting of the blade portion into the joint pipe is also maintained. Therefore, the biting of the retaining ring body and the blade portion into the pipe becomes a large resistance to the pipe pulling force, so that it is possible to prevent detachment of the pipe.

In this case, the inclination mechanism may include a second surface of each second protruding portion which faces the second facing portion, and a second surface of each second facing portion which faces said second surface, and either one of the second surfaces may be inclined in the pipe axis direction with respect to the reference plane.

Moreover, the inclination mechanism may include a second surface of each second protruding portion which faces the second facing portion, a second surface of each second facing portion which faces said second surface, and a contact member interposed between the second surface of each second protruding portion and the second surface of each second facing portion, and either one of contact surfaces of the contact member that comes into contact with one of the second surfaces may be inclined in the pipe axis direction with respect to the reference plane.

In any one of the above configurations, the inclination mechanism may cause the circumferential end portion to be closer to the fitting body and may move the circumferential center portion away from the fitting body. When the retaining ring is tightened by the tightening means, since the retaining ring bites into the joint pipe on the circumferential end portion side, on which the tightening means is located, more than at the circumferential center portion of the retaining ring body, a pipe detachment force is generated earlier on the circumferential end portion side. Therefore, by causing the circumferential end portion of the retaining ring to be closer to the fitting body and moving the circumferential center portion away from the fitting body, the retaining ring can be inclined with the circumferential end portion side, on which the retaining ring relatively strongly bites into the joint pipe, as a base point. Thus, the retaining ring is relatively easily inclined to deform the joint pipe, and detachment of the pipe is more firmly prevented.

Moreover, in the retaining ring body, an inner diameter of the blade portion may be reduced to be 97% or less of an outer diameter of the joint pipe by the tightening means. Accordingly, since the blade portion sufficiently bites into the joint pipe, even when use water pressure or test water pressure is applied, connection between the retaining ring and the joint pipe is maintained in a state where the axial directions of the retaining ring, the joint pipe, and the fitting body coincide with each other, so that detachment of the joint pipe from the pipe fitting can be firmly prevented while flexible stretching and contraction of the joint pipe is ensured.

In any one of the above configurations, the joint pipe may have a nominal diameter of 13 to 25. In addition, in any one of the above other configurations, the joint pipe may have a nominal diameter of 30 to 50.

In any one of the above configurations, the joint pipe may be, for example, a low-density polyethylene pipe (LLDPE/PE50). In addition, the joint pipe may be a high-performance polyethylene pipe (HPPE/PE100).

Advantageous Effects of the Invention

According to the features of the pipe detachment preventing device for a union nut pipe fitting according to the present invention, it becomes possible to omit an inner core and prevent detachment of the pipe from the pipe fitting even when a large pulling force which stretches the pipe acts.

Other objects, configurations, and effects of the present invention will become apparent from the following description of embodiments of the present invention.

DESCRIPTION OF EMBODIMENTS

Next, a first embodiment of the present invention will be described in detail with reference to FIGS. 1 to 6D.

(Overview of Device 1)

Figure 1:
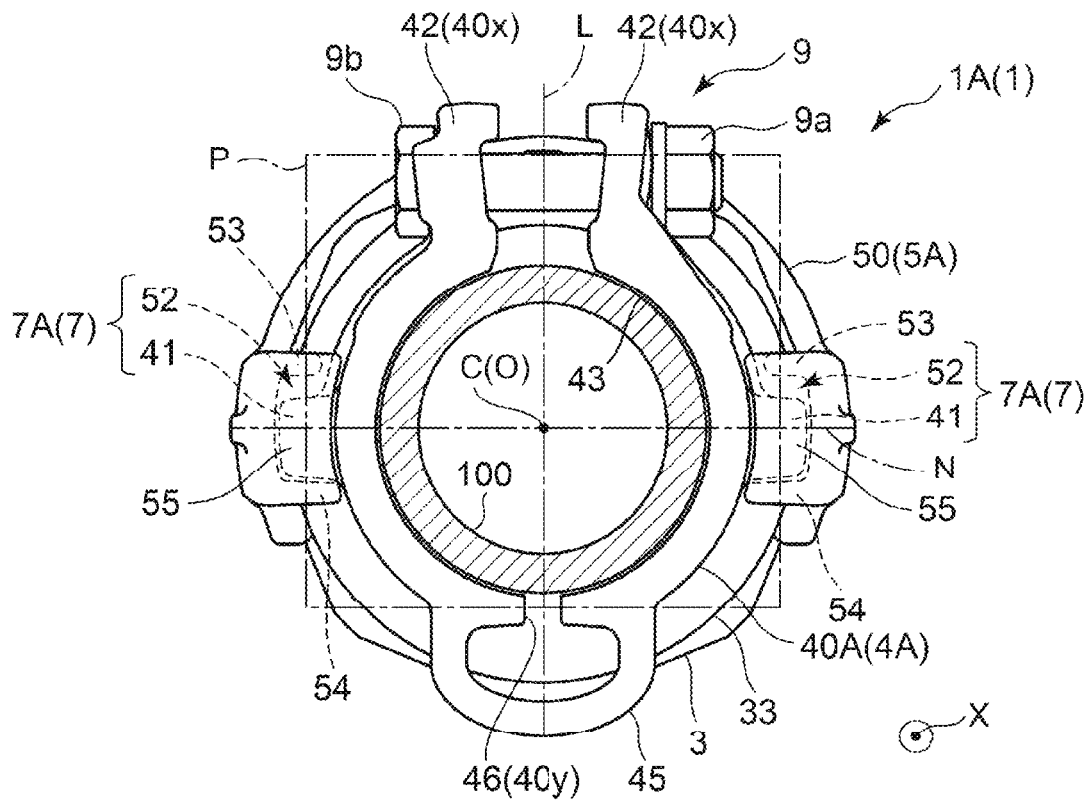
FIG. 1 is a front view showing a pipe detachment preventing device according to a first embodiment of the present invention.
Figure 2:
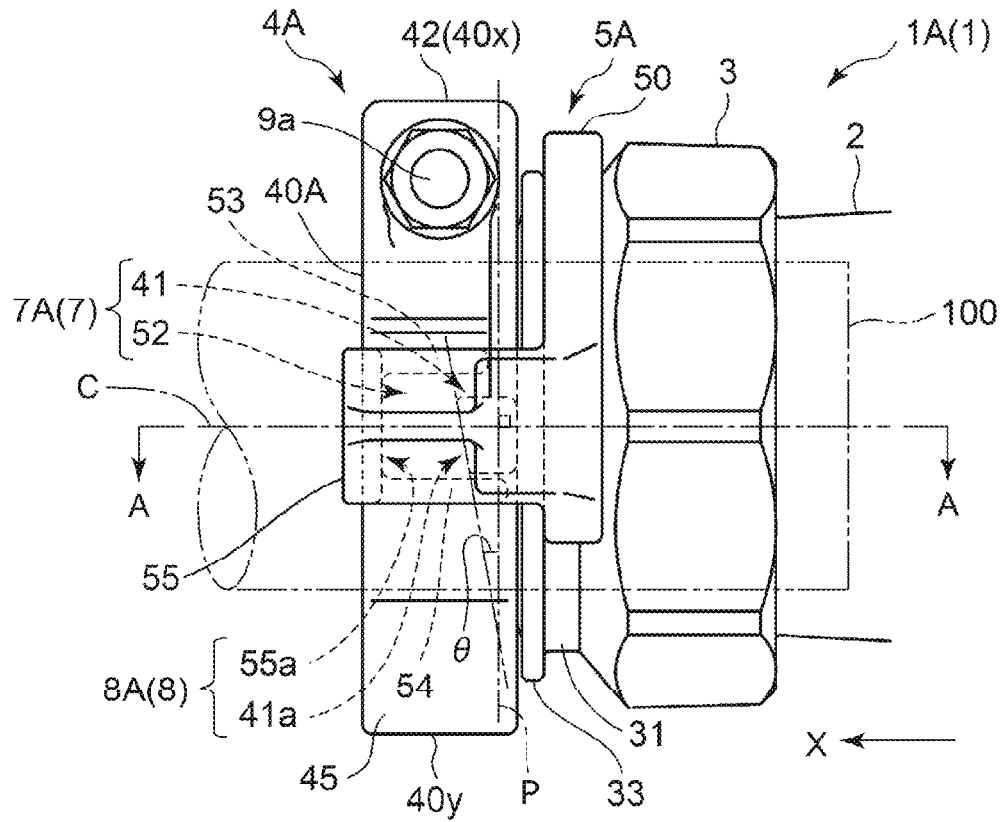
FIG. 2 is a side view of FIG. 1.
Figure 3:
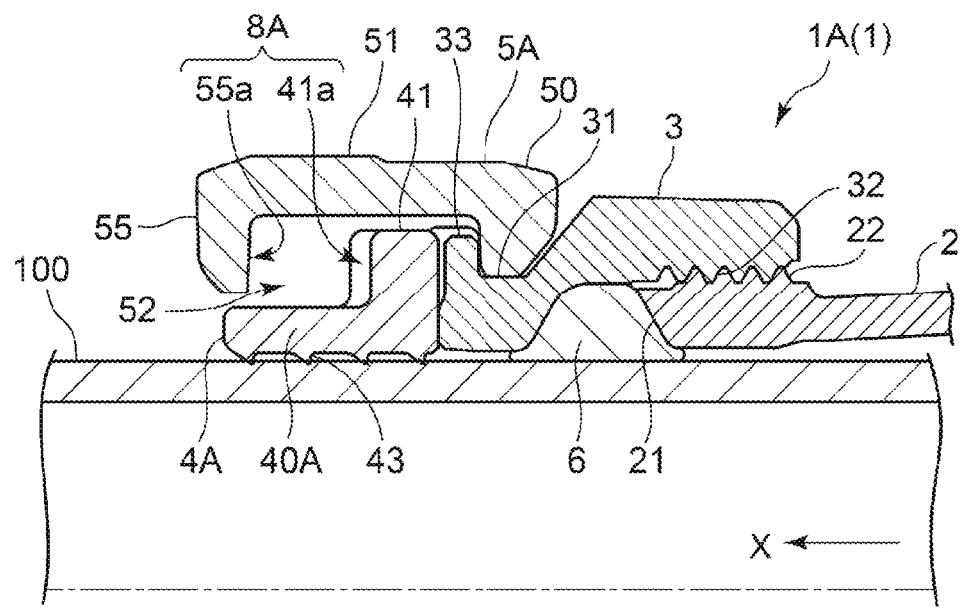
FIG. 3 is a cross-sectional view taken along a line A-A in FIG. 2.

As shown in FIGS. 1 to 3, a pipe detachment preventing device 1A according to the first embodiment of the present invention roughly includes: a fitting body 2 into which a non-threaded joint pipe 100 is inserted; a union nut 3 screwed and tightened to a receiving portion 21 of the fitting body 2 with an annular rubber packing 6 interposed therebetween; a retaining ring 4A fixed to the outer peripheral surface of the joint pipe 100 by reducing the diameter of a retaining ring body 40A by tightening means 9; a locking tool 5A detachably attached to the union nut 3; and connection holding means 7A configured to hold connection between the retaining ring 4A and the locking tool 5A.

(Joint Pipe 100)

In the present embodiment, the joint pipe 100 is, for example, a polyethylene double-layer pipe for water supply (type 1, PE50), and the nominal diameter thereof is 13 to 25. In the case of a polyethylene pipe, unless the inner diameter of blade portions 43, which will be described later, is reduced via the retaining ring 4A to be slightly smaller than the pipe outer diameter (for example, 97% or less) to cause the blade portions 43 to bite into the joint pipe 100, it is difficult to prevent detachment of the pipe. For such a plastic pipe having elasticity and flexibility, the pipe detachment preventing device 1 according to the present invention improves the holding force (detachment preventing force) for the pipe. In the present embodiment, an inner core is not inserted into the joint pipe 100.

Here, for the polyethylene pipe (PE50), a linear low-density polyethylene (corresponding to LLDPE/PE50) resin is used. PE50 refers to a pipe for which the 97.5% confidence lower limit of a long-term hydrostatic strength obtained by the method specified in ISO 9080: "Plastics piping and ducting systems—Determination of the long-term hydrostatic strength of thermoplastics materials in pipe form by extrapolation" is 5.00 to 6.29 MPa, and is classified as one having minimum required strength (MRS)=5.0 MPa. It should be noted that the long-term hydrostatic strength (minimum required strength) is a circumferential stress value that allows the pipe to withstand use at 20° for 50 years, and is calculated (predicted) on the basis of data of an internal pressure creep test.

(Fitting Body 2, Union Nut 3)

As shown in FIGS. 1 to 3, the fitting body 2 includes the receiving portion 21 having a tapered shape, and an external thread 22 formed on the outer peripheral surface of the receiving portion 21. The external thread 22 is screwed with an internal tread 32 formed on the inner peripheral surface of the union nut 3. By screwing and tightening the union nut 3 to the receiving portion 21, the rubber packing 6 is compressed and deformed to ensure water sealability. An annular fitting groove 31 into which a main body 50 of the locking tool 5A, which will be described later, is fitted is provided on the outer peripheral surface of the union nut 3. It should be noted that although not shown, for example, a lubricating material such as a film made of a fluorine resin or the like is interposed between the union nut 3 and the rubber packing 6 to smoothly reduce the diameter of the rubber packing 6.

(Retaining Ring 4A)

As shown in FIGS. 1 to 4, the retaining ring 4A includes the retaining ring body 40A having a C-shaped ring shape, a pair of first protruding portions 41, 41 protruding outward from the retaining ring body 40A, and a pair of projecting pieces 42, 42 protruding outward from both ends of the retaining ring body 40A. Each projecting piece 42 is provided with a through hole through which a bolt 9a of the tightening means 9 is inserted. In addition, a plurality of the annular blade portions 43 which bite into the joint pipe 100 by the diameter reduction of the retaining ring body 40A are provided on the inner surface of the retaining ring body 40A. The tip of each blade portion 43 is sharply formed.

Each first protruding portion 41 has a substantially rectangular shape and is erected on an edge portion of the retaining ring body 40A on the fitting body 2 side. The pair of first protruding portions 41 are each located at an intermediate portion between a circumferential end portion 40x (projecting piece 42) of the retaining ring body 40A and a circumferential center portion 40y (slit 44) of the retaining ring body 40A, and are provided so as to be bilaterally symmetrical with respect to the circumferential center portion 40y.

It should be noted that, in the present embodiment, in the circumferential center portion 40y, the slit 44 is formed, and a bifurcated portion 45 is also provided so as to extend over the slit 44. Accordingly, even when the joint pipe 100 having a relatively small diameter is deeply (largely) reduced in diameter, the retaining ring 4A is not cracked or damaged.

(Locking Tool 5A)

As shown in FIGS. 1 to 3 and 5, the locking tool 5A roughly includes the main body 50 having a horseshoe shape, a pair of arm portions 51, 51 extending along a pipe axis direction X from both end portions of the main body 50, and first receiving portions 52 which are provided at the respective arm portions 51 and which receive the first protruding portions 41.

Each first receiving portion 52 includes an upper wall portion 53 and a lower wall portion 54 which protrude inward (toward the center of the main body 50) from the arm portion 51 and which face each other along the pipe axis direction X, and a side wall portion 55 connecting the upper wall portion 53 and the lower wall portion 54, and has a substantially U cross-sectional shape. The side wall portion 55 is provided at an end portion (on the joint pipe 100 side) of the arm portion 51 so as to be orthogonal to the pipe axis direction X. In the present embodiment, the side wall portion 55 is a first facing portion facing the first protruding portion 41 in the pipe axis direction X.

(Connection Holding Means 7A, Inclination Mechanism 8A)

Figure 4:
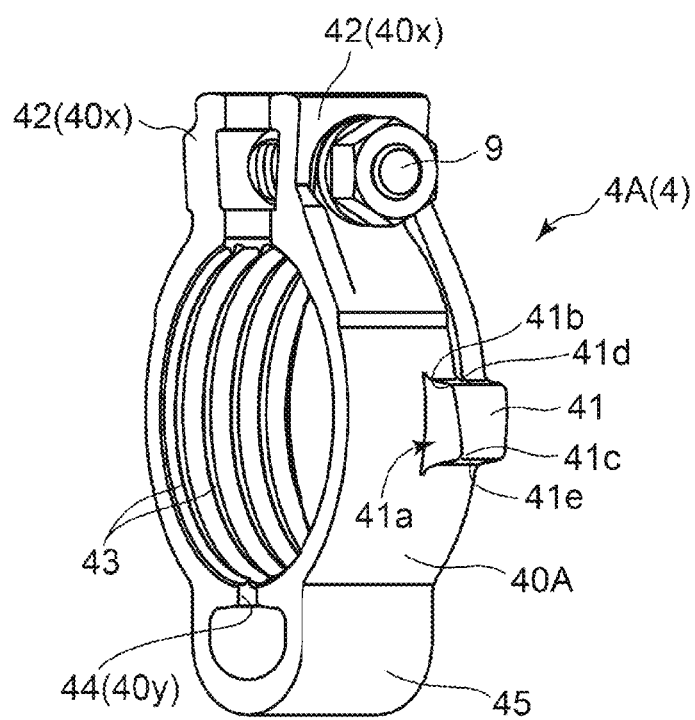
FIG. 4 is a perspective view of a retaining ring of the first embodiment.
Figure 5:
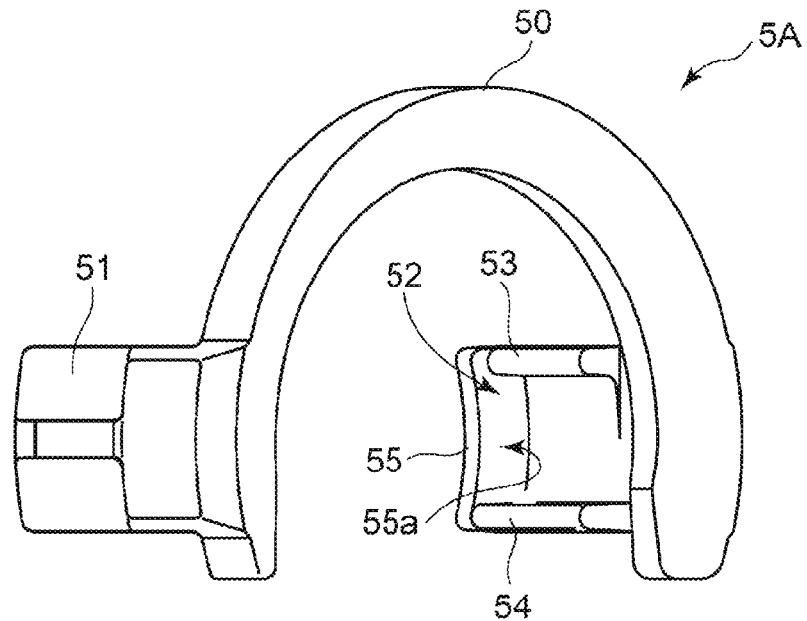
FIG. 5 is a perspective view of a locking tool of the first embodiment.

In the present embodiment, the connection holding means 7A includes the first protruding portions 41 of the retaining ring 4A and the first receiving portions 52 of the locking tool 5A which face each other in the pipe axis direction X. In addition, an inclination mechanism 8A includes first surfaces 41a of the first protruding portions 41 and first surfaces 55a of the side wall portions 55 of the first receiving portions 52 of the locking tool 5A. As shown in FIG. 2, the first surface 41a of each first protruding portion 41 is inclined at an inclination angle $\theta$ with respect to a reference plane P orthogonal to a central axis C of the retaining ring body 40A. Meanwhile, the first surface 55a of each side wall portion 55 is parallel to the reference plane P. In the present embodiment, as shown in FIG. 4, the first surface 41a is formed as an inclined surface by forming an upper portion 41d (circumferential end portion 40x side) of the first protruding portion 41 such that the upper portion 41d is longer (thicker) than a lower portion 41e (circumferential center portion 40y side).

It should be noted that the inclination mechanism 8A may incline the retaining ring 4A at an angle of greater than 0° and not greater than 20° with respect to the reference plane P. Preferably, the angle is not less than 1° and not greater than 20°. As the inclination angle increases, the size of the space that allows the inclination also increases. The inclination mechanism 8A does not function at normal water pressure, so that when the size of the space increases, the joint pipe 100 can be stretched and contracted more than necessary by the increase in size. Therefore, when the retaining ring 4A is inclined at an angle greater than 20°, the joint pipe 100 may be separated from the rubber packing 6, causing water leak, so that it is difficult to ensure water sealability. If the joint pipe 100 (nominal diameter: 13 to 25) in the present embodiment is a low-density polyethylene pipe (PE50), the inclination angle is preferably not less than 5° and not greater than 20° and further preferably not less than 6° and not greater than 10°. According to a tensile experiment by the inventor, in the case of a polyethylene double-layer pipe for water supply (type 1, PE50) having a nominal diameter of 20, a pipe stretching stroke (strain value) was 12% with respect to a distance of 500 mm between fixed portions of the pipe at an incubation angle of 0°, but the pipe was stretched by 16.9% at an inclination angle of 6° and by 39% or more at an inclination angle of 10° and was not pulled out. As described above, even if an inner core is not present and the pipe is significantly reduced in diameter beyond the yield point of the polyethylene pipe, the pipe does not become detached, and detachment of the pipe is prevented.

However, the inclination angle at which the inclination mechanism 8A inclines the retaining ring 4 does not necessarily coincide with the inclination angle $\theta$ of the first surface 41a with respect to the reference plane P. The maximum inclination angle at which the inclination mechanism 8A inclines the retaining ring 4A is determined by the amount by which the joint pipe 100 can be stretched and contracted between the retaining ring 4A and the fitting body 2. Thus, if the amount by which the joint pipe 100 can be stretched is small, the retaining ring 4A is inclined at an angle smaller than the inclination angle $\theta$ of the first surface 41a with respect to the reference plane P.

(Description of Pipe Pulling Out)

Next, the behavior of the retaining ring 4A and the joint pipe 100 in the pipe detachment preventing device 1A will be described with reference to FIGS. 6A, 6B, 6C and 6D.

FIGS. 1 and 2 show the pipe detachment preventing device 1A in a state before the retaining ring 4A is tightened by the tightening means 9 (before diameter reduction). Thereafter, the retaining ring 4A is tightened by the tightening means 9 to obtain a state shown in FIG. 6A. In this state, each first protruding portion 41 and each side wall portion 55 are separated from each other, so that the joint pipe 100 can be stretched and contracted, and no water pressure is applied.

Figure 6A:
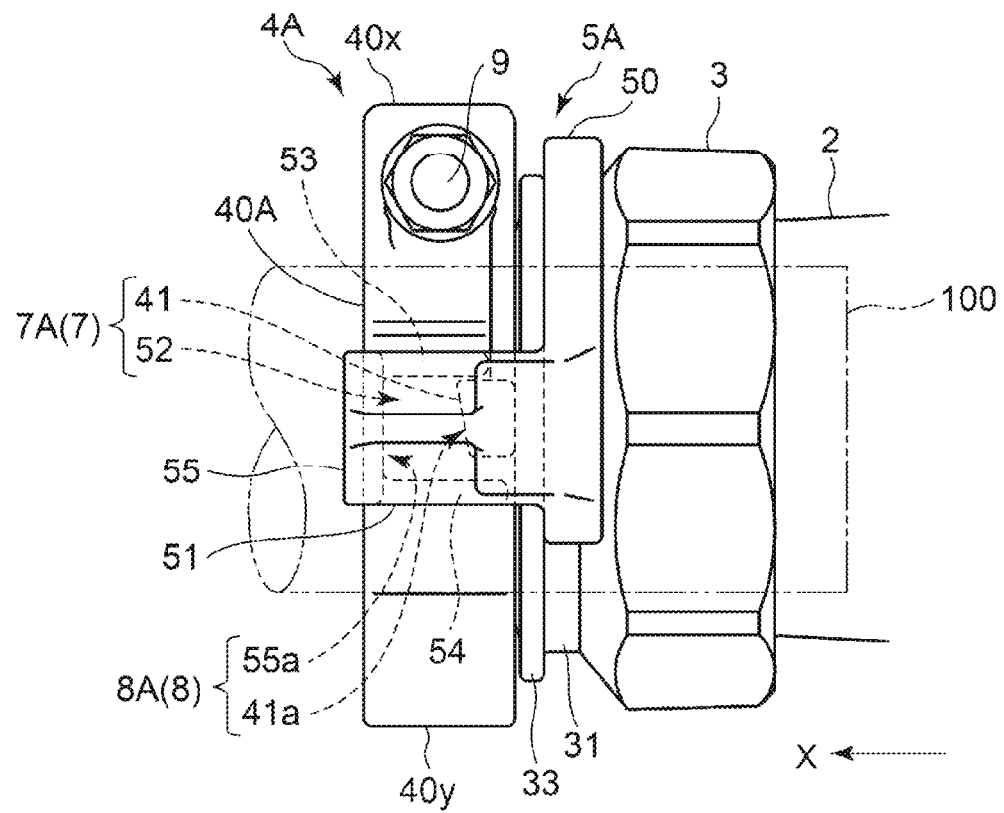
FIG. 6A is a diagram corresponding to FIG. 2 and showing a state where the retaining ring is tightened (a state where no water pressure is applied).
Figure 6B:
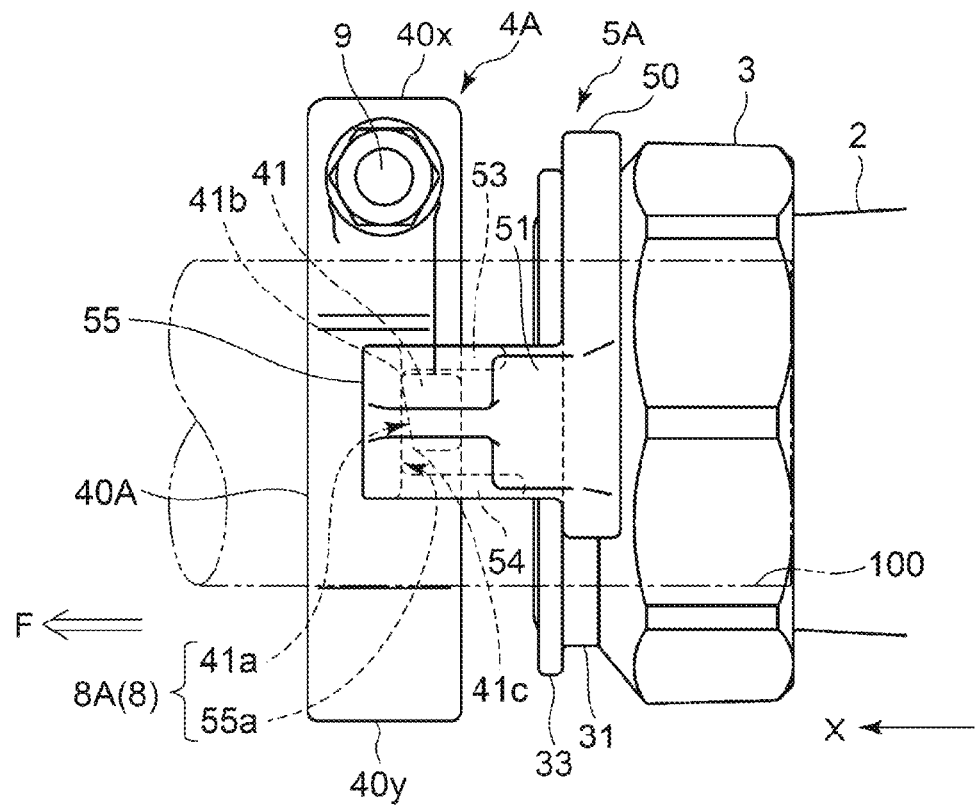
FIG. 6B is a diagram corresponding to FIG. 2 and showing a state where a pipe detachment force is applied to a joint pipe.

Then, when a pipe pulling force F is generated in the pipe axis direction X at the joint pipe 100, as shown in FIG. 6B, the joint pipe 100 is stretched, the retaining ring 4A becomes separated from the union nut 3, and each first protruding portion 41 comes into contact with the side wall portion 55. In the present embodiment, an upper end 41b of each first surface 41a first comes into contact with the side wall portion 55. In a normal use state where water pressure is applied (for example, use water pressure: 0.75 Mpa, test water pressure: 1.75 MPa), as shown in the same figure, the retaining ring 4A is not inclined, the fitting body 2 and the joint pipe 100 are maintained in the same axial direction (a horizontal state on the sheet of the figure), and the inclination mechanism 8A does not function. At this time, the blade portions 43 bite into the joint pipe 100 due to the diameter reduction of the retaining ring body 40A by the tightening means 9, so that detachment of the pipe is suppressed.

Figure 6C:
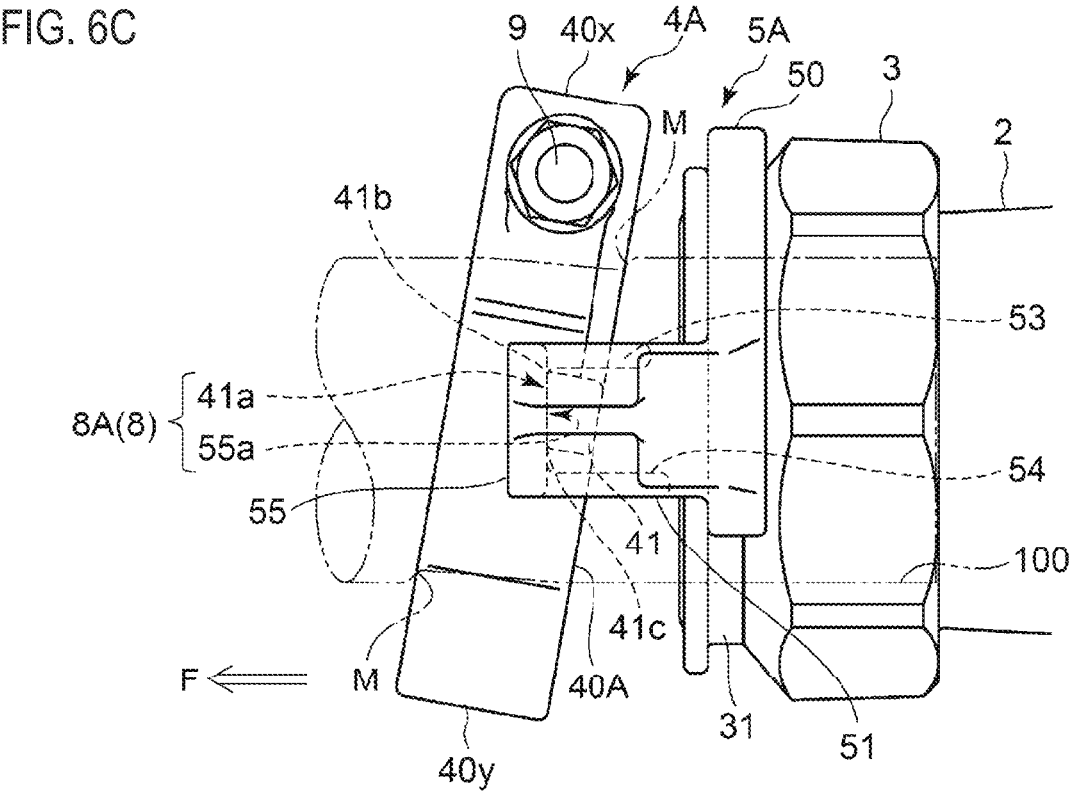
FIG. 6C is a diagram corresponding to FIG. 2 and showing a state where a pipe detachment force is applied to the joint pipe and the retaining ring is inclined in a state water pressure is low or no water pressure is applied.

On the other hand, if the pipe pulling force F is applied when the water pressure is low or not applied, the joint pipe 100 is stretched and also gradually becomes thinner (reduced in diameter), and the biting of the blade portions 43 due to the diameter reduction of the retaining ring body 40A also gradually becomes weaker (shallower). However, in the present embodiment, a space (gap) is formed between the first surface 55a of each side wall portion 55 and a lower end 41c of the first surface 41a of each first protruding portion 41. Thus, if the pipe pulling force F is applied in a state where the upper end 41b of each first surface 41a is in contact with the side wall portion 55, as shown in FIG. 6C, the retaining ring 4A is inclined with the upper end 41b as a base point by the first surface 41a such that the circumferential end portion 40x becomes closer to the fitting body 2 and the circumferential center portion 40y is moved away from the fitting body 2. Then, the retaining ring body 40A comes into contact with and bites into the joint pipe 100 at two locations on the upper side and the lower side to deform (bend) the joint pipe 100. The retaining ring body 40A opposes the pipe pulling force F by biting into the joint pipe 100 so as to hold the joint pipe 100 from above and below. Furthermore, the retaining ring 4A is further inclined with further stretching of the joint pipe 100, so that the biting of the blade portions 43 into the joint pipe 100 is also maintained. Therefore, detachment of the pipe can be prevented by the biting of the retaining ring 4A and the blade portions 43 into the pipe.

Moreover, since the retaining ring 4A bites into the joint pipe 100 on the circumferential end portion 40x side, on which the tightening means 9 is located, more than in the vicinity of the circumferential center portion 40y, the pipe pulling force F is likely to be generated on the circumferential end portion 40x side. Therefore, by inclining the retaining ring 4A with the upper portion 41b side of the first protruding portion 41 as a base point, the retaining ring 4A can be relatively easily inclined and caused to bite into the joint pipe 100, so that detachment of the pipe can be more firmly prevented.

Figure 6D:
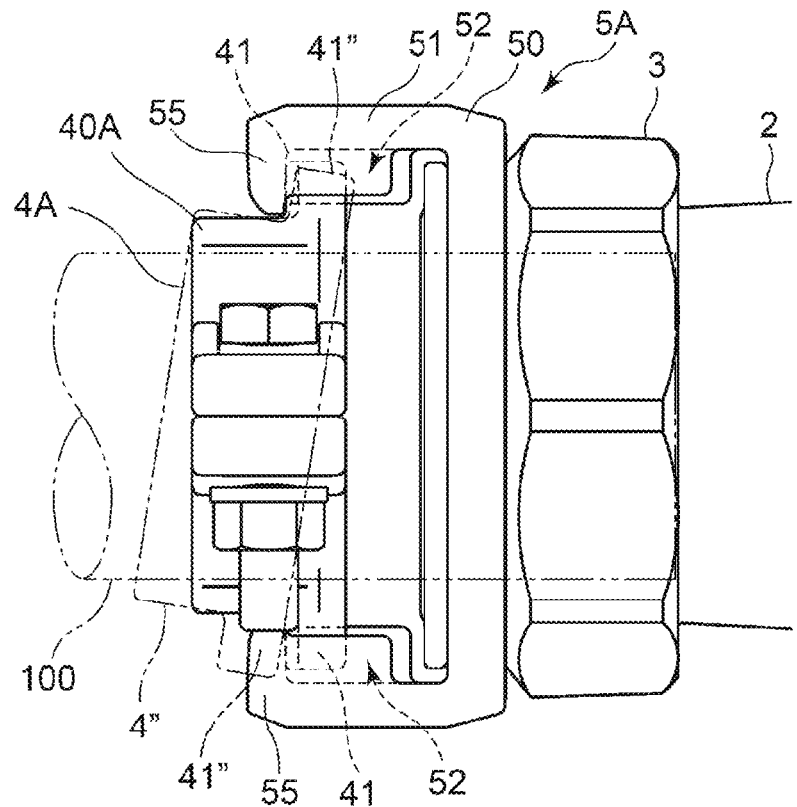
FIG. 6D is a plan view of FIG. 6B.
Figure 7:
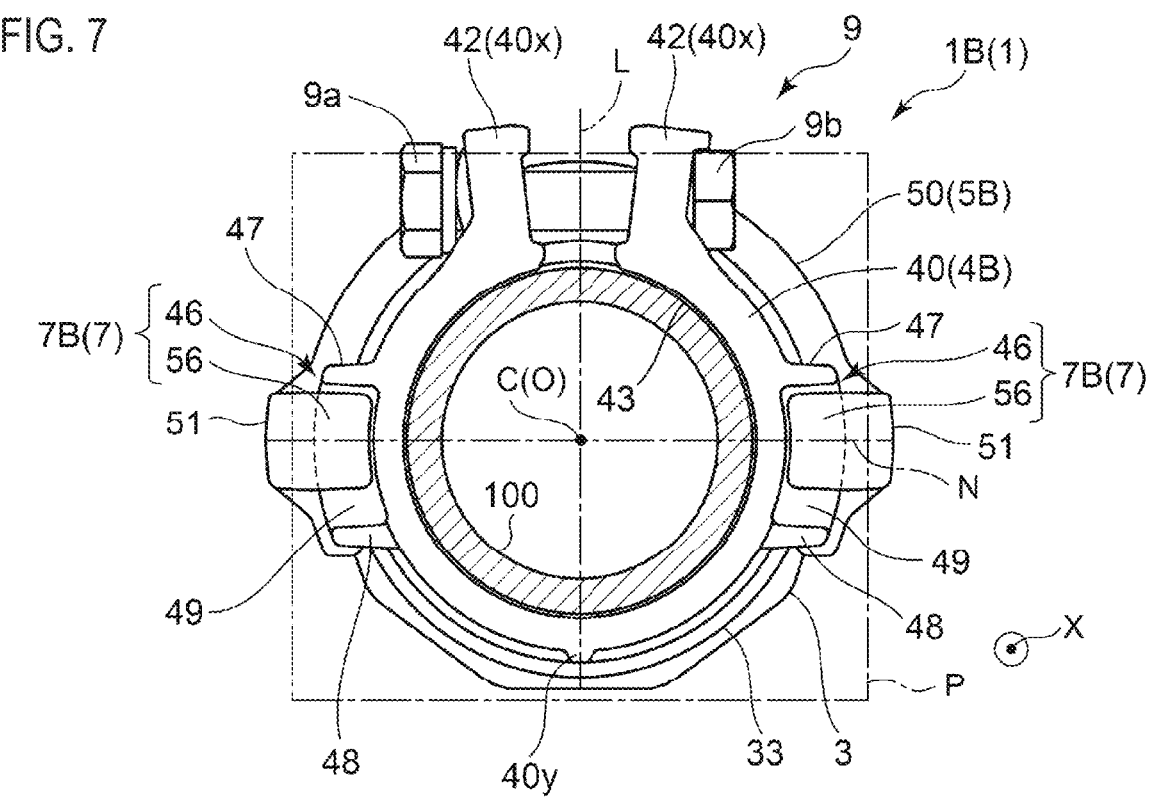
FIG. 7 is a front view showing a pipe detachment preventing device according to a second embodiment of the present invention.

It should be noted that, as shown by an alternate long and short dash line in FIG. 6D, it is conceivable to deform the joint pipe 100 by rotating a retaining ring 4″ in a plan view. However, it is necessary to make the lengths of the arm portions 51 on the left and right sides different from each other such that the retaining ring 4″ is rotatable. In this case, when the use water pressure is applied, a first protruding portion 41″ is locked only to the first receiving portion 52 of one arm portion 51, so that the joint pipe 100 becomes bent and does not function as a fitting. That is, even if the pipe is connected in an orderly manner before the water pressure is applied, when the water pressure is applied, the pipe is not straightly arranged at the fitting portion and becomes disordered. Furthermore, when the retaining ring 4″ is rotated (inclined), the first receiving portion 52 and the first protruding portion 41″ easily become disengaged.

As described above, the inclination mechanism 8 of the present invention inclines the retaining ring 4A in the pipe axis direction X with respect to the reference plane P orthogonal to the central axis C of the retaining ring body 40A. In other words, in the present invention, the inclination mechanism 8 inclines the retaining ring 4A toward a horizontal plane N which includes the central axis C of the retaining ring body 40A and which is orthogonal to a center line L connecting a center O of the retaining ring body 40A and the circumferential center portion 40y. Therefore, if the joint pipe 100 is a low-density polyethylene pipe (PE50) as in the present embodiment, when the water pressure is low or not applied, even if a pipe pulling force which stretches the joint pipe 100 is applied (for example, the joint pipe 100 is hit accidentally by a heavy machine during construction, or the road collapses due to an earthquake) and the joint pipe 100 is stretched and becomes thinner (reduced in diameter), detachment of the pipe is prevented by the inclination mechanism 8. On the other hand, in a state of the use water pressure or test water pressure (normal use state), the inclination mechanism 8 does not function, and detachment of the pipe is prevented only by the biting of the blade portions 43 of the retaining ring 4 into the joint pipe 100.

Second Embodiment

Next, a second embodiment of the present invention will be described with reference to FIGS. 7 to 12C.

It should be noted that, in the following embodiment, the same members as those in the first embodiment are designated by the same reference characters.

In a pipe detachment preventing device 1B for a union nut pipe fitting according to the second embodiment of the present invention, a retaining ring 4B and a locking tool 5B are different from the retaining ring 4A and the locking tool 5A of the first embodiment. It should be noted that, in the present embodiment, the nominal diameter of the polyethylene double-layer pipe for water supply (type 1, PE50) as the joint pipe 100 is, for example, 30 to 50. Also in the present embodiment, an inner core is not inserted into the joint pipe 100.

(Retaining Ring 4B)

As shown in FIGS. 7 to 10, instead of the first protruding portions 41 of the first embodiment, the retaining ring 4B includes a pair of second receiving portions 46, 46 which are provided on the outer peripheral surface of a retaining ring body 40B and which receive second protruding portions 56 of the locking tool 5B. Each second receiving portion 46 includes an upper wall portion 47 and a lower wall portion 48 which protrude outward from the retaining ring body 40B and which face each other along the pipe axis direction X, and a side wall portion 49 connecting the upper wall portion 47 and the lower wall portion 48 on the fitting body 2 side, and has a substantially U cross-sectional shape.

(Locking Tool 5B)

As shown in FIGS. 7 to 9 and 11, instead of the first receiving portions 52 of the first embodiment, the locking tool 5B includes the second protruding portions 56 which protrude inward at end portions of the pair of arm portions 51, 51.

(Connection Holding Means 7B, Inclination Mechanism 8B)

Figure 8:
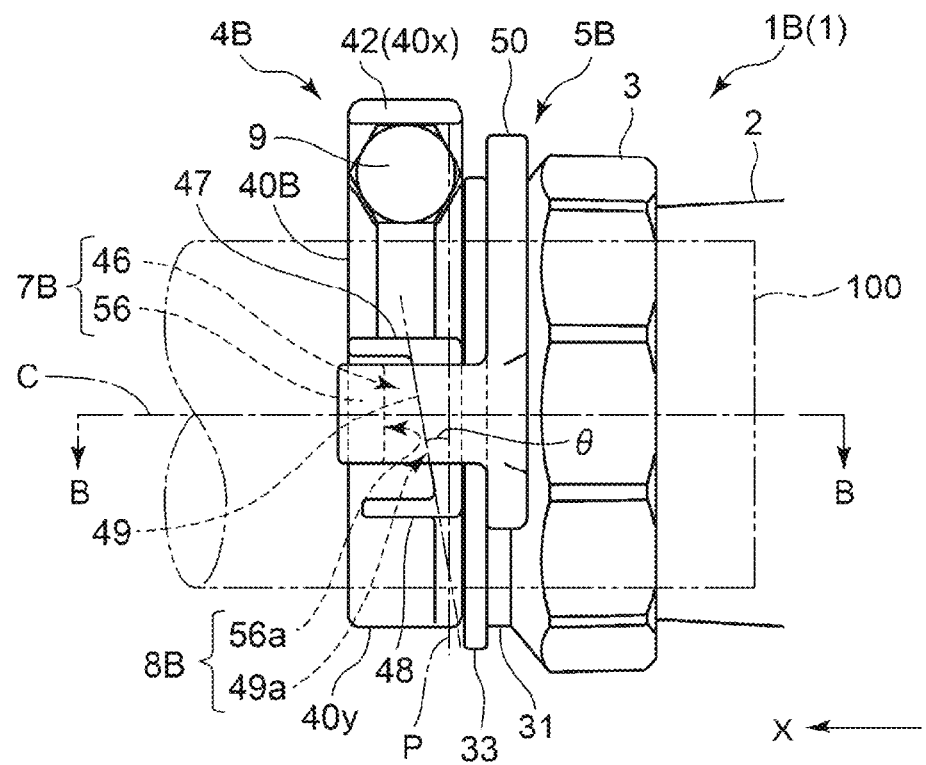
FIG. 8 is a side view of FIG. 7.
Figure 9:
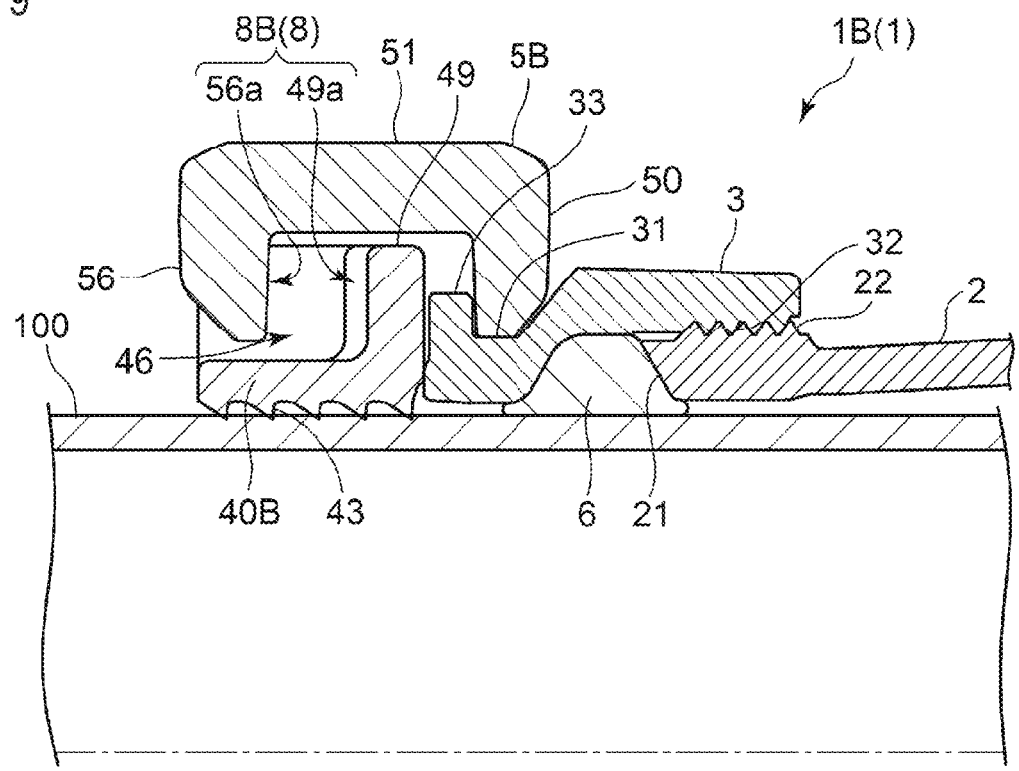
FIG. 9 is a cross-sectional view taken along a line B-B in FIG. 8.
Figure 10:
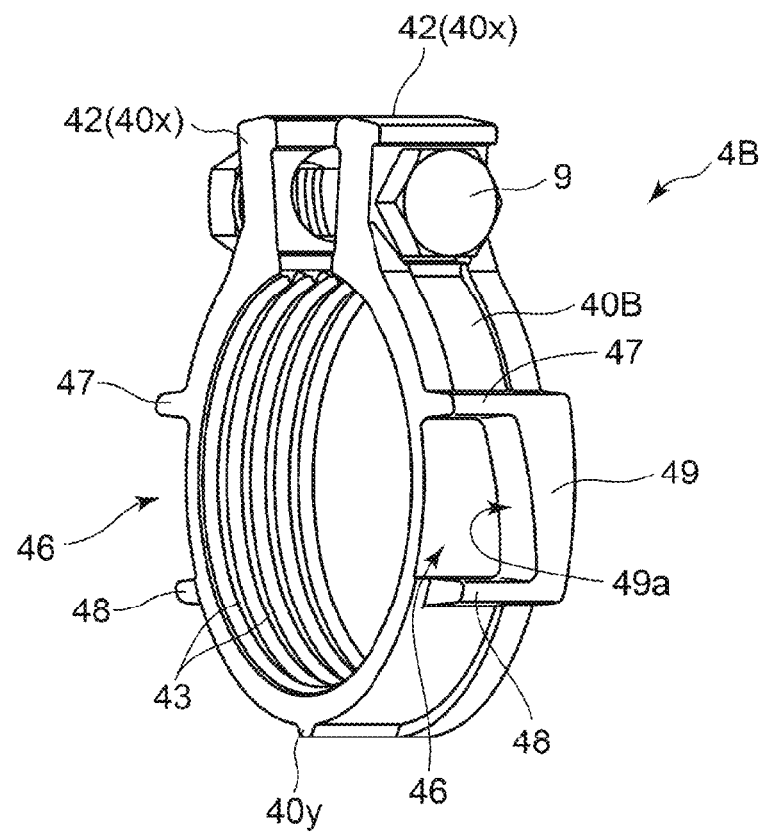
FIG. 10 is a perspective view of a retaining ring of the second embodiment.
Figure 11:
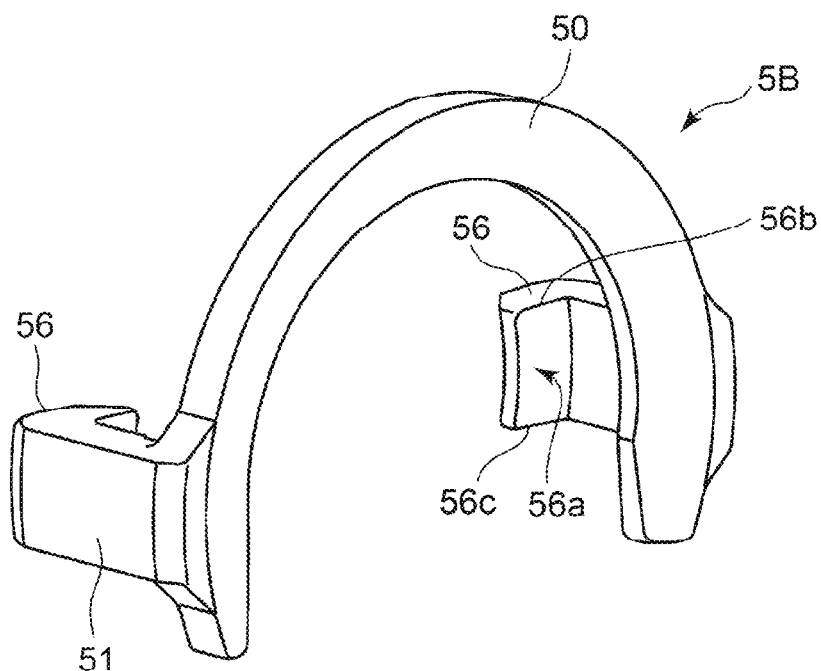
FIG. 11 is a perspective view of a locking tool of the second embodiment.

In the present embodiment, connection holding means 7B includes the second protruding portions 56 of the locking tool 5B and the second receiving portions 46 of the retaining ring 4B which face each other in the pipe axis direction X. In addition, an inclination mechanism 8B includes second surfaces 56a of the second protruding portions 56 and second surfaces 49a of the side wall portions 49. Here, as shown in FIG. 8, whereas the second surface 49a of each side wall portion 49 is inclined at an inclination angle θ with respect to the reference plane P, the second surface 56a of each second protruding portion 56 is parallel to the reference plane P. In the present embodiment, as shown in FIG. 10, the second surface 49a is formed as an inclined surface by forming the side wall portion 49 such that the thickness of the side wall portion 49 is increased from the lower wall portion 48 (circumferential center portion 40y) toward the upper wall portion 47 (circumferential end portion 40x side).

It should be noted that the inclination mechanism 8B may incline the retaining ring 4B at an angle of greater than 0° and not greater than 15° with respect to the reference plane P. Preferably, the angle is not less than 1° and not greater than 15°. If the joint pipe 100 (nominal diameter: 30 to 50) in the present embodiment is a low-density polyethylene pipe (PE50), the angle is further preferably not less than 5° and not greater than 15°. According to a tensile experiment by the inventor, in the case of a polyethylene double-layer pipe for water supply (type 1, PE50) having a nominal diameter of 50, a pipe stretching stroke (strain value) was 11.3% with respect to a distance of 500 mm between fixed portions of the pipe at an incubation angle of 0°, but was 16.2% at an inclination angle of 6° and 27.8% at an inclination angle of 10°. As described above, in the present embodiment as well, detachment of the pipe is prevented.

(Description of Pipe Pulling Out)

Next, the behavior of the retaining ring 4B and the joint pipe 100 in the pipe detachment preventing device 1B will be described with reference to FIGS. 12A, 12B and 12C.

Figure 12A:
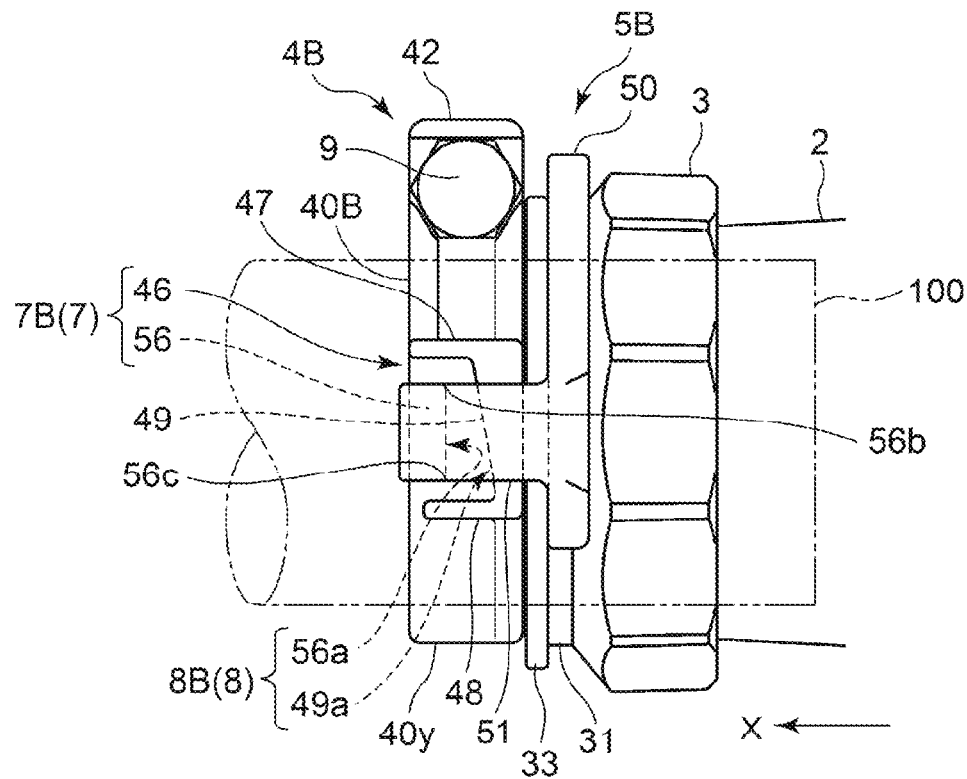
FIG. 12A is a diagram corresponding to FIG. 6A in the second embodiment.

In a state where the retaining ring 4B is tightened by the tightening means 9 as shown in FIG. 12A, each second protruding portion 56 and each side wall portion 49 are separated from each other, so that the joint pipe 100 can be stretched and contracted, and no water pressure is applied. Then, when a pipe pulling force F is generated in the pipe axis direction X at the joint pipe 100, as shown in FIG. 12B, the joint pipe 100 is stretched, the retaining ring 4B becomes separated from the union nut 3, and each second protruding portion 56 comes into contact with the side wall portion 49. In the present embodiment, an upper end 56b of each second surface 56a located on the upper wall portion 47 side of the second receiving portion 46 first comes into contact with the side wall portion 49. This figure shows a normal state where water pressure is applied, similar to the above embodiment.

A space (gap) is formed between the second surface 49a of each side wall portion 49 and a lower end 56c of the second surface 56a of each second protruding portion 56. Thus, if the pipe pulling force F is applied in a state where the upper end 56b of each second surface 56a is in contact with the side wall portion 49, the joint pipe 100 is stretched and also gradually becomes thinner (reduced in diameter), so that, as shown in FIG. 12C, the retaining ring 4B is inclined with the upper end 56b as a base point by the second surface 49a such that the circumferential end portion 40x becomes closer to the fitting body 2 and the circumferential center portion 40y is moved away from the fitting body 2. Then, the retaining ring body 40B comes into contact with and bites into the joint pipe 100 at two locations on the upper side and the lower side to deform (bend) the joint pipe 100. The retaining ring body 40B opposes the pipe pulling force F by biting into the joint pipe 100 so as to hold the joint pipe 100 from above and below. Furthermore, the retaining ring 4B is further inclined with further stretching of the joint pipe 100, so that the biting of the blade portions 43 into the joint pipe 100 is also maintained. Therefore, detachment of the pipe can be prevented by the biting of the retaining ring 4B and the blade portions 43 into the pipe.

Other Embodiments

Finally, the possibilities of still other embodiments of the present invention will be described.

Figure 13:
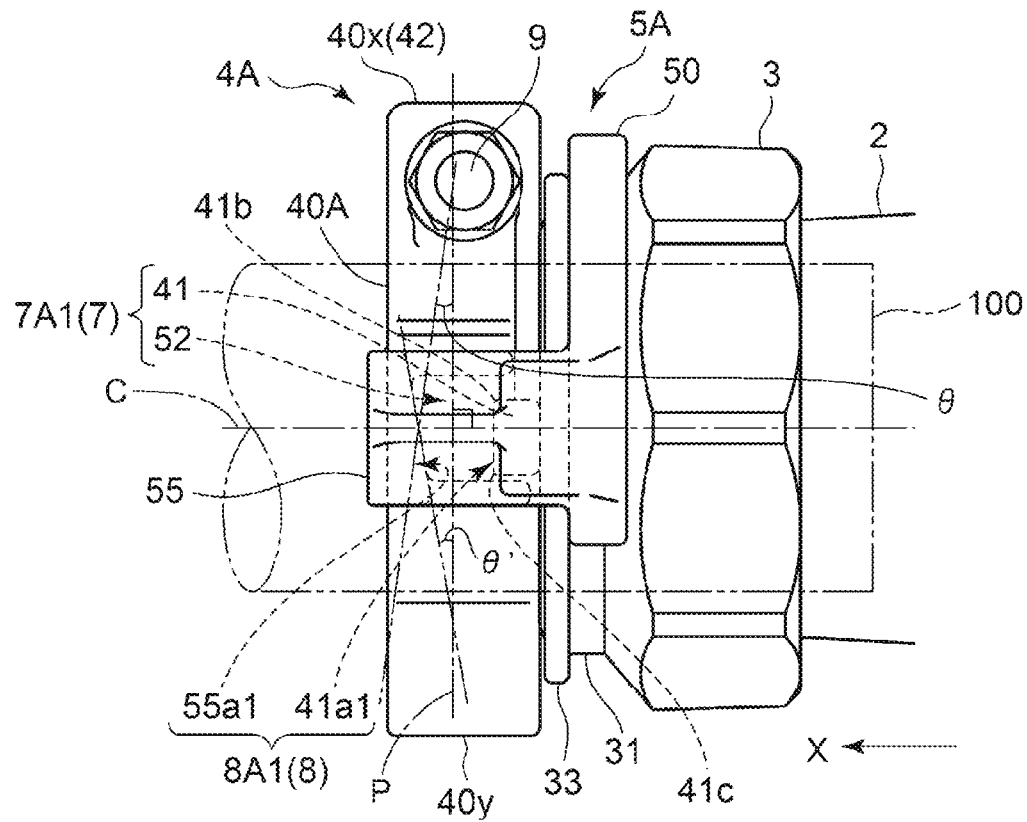
FIG. 13 is a side view showing a modification of the first embodiment.

In the above first embodiment, the inclination mechanism 8A includes the first surfaces 41a of the first protruding portions 41 and the first surfaces 55a of the side wall portions 55, and inclines the first surfaces 41a with respect to the reference plane P. However, as shown in FIG. 13, an inclination mechanism 8A1 may be configured such that a first surface 55a1 of each side wall portion 55 is inclined with respect to the reference plane P (an alternate long and short dash line in the figure) and a first surface 41a1 of each first protruding portion 41 is parallel to the reference plane P. In this case, the retaining ring 4A is inclined with the upper end 41b of the first surface 41a1 as a base point by the second surface 55a1 such that the circumferential end portion 40x becomes closer to the fitting body 2 and the circumferential center portion 40y is moved away from the fitting body 2.

Figure 14:
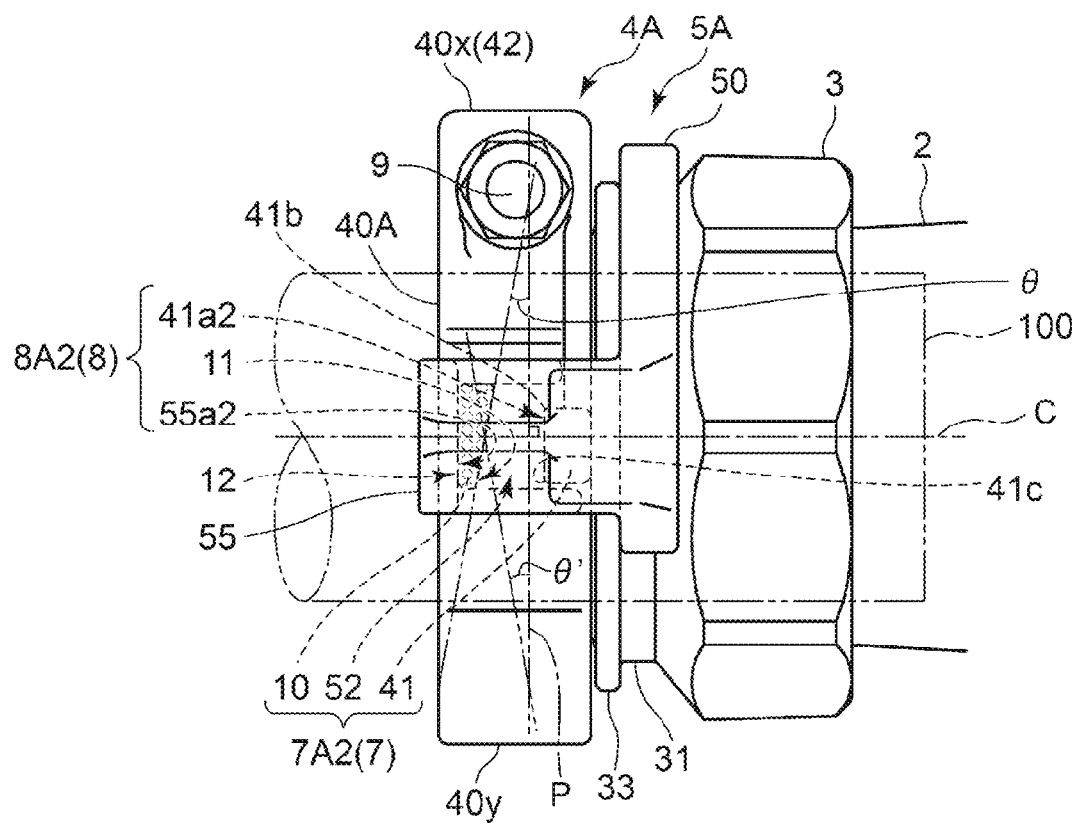
FIG. 14 is a side view showing another modification of the first embodiment.

Furthermore, as shown in FIG. 14, a first surface 41a2 of each first protruding portion 41 and a first surface 55a2 of each side wall portion 55 may be parallel to the reference plane P, and a contact member 10 may be interposed between these first surfaces 41a2 and 55a2, and an inclination mechanism 8A2 may be configured by these first surfaces 41a2 and 55a2 and the contact member 10. In the example of this figure, a contact surface 11 of the contact member 10 which faces the first surface 41a2 of the first protruding portion 41 is inclined with respect to the reference plane P (an alternate long and short dash line in the figure). In this case, the retaining ring 4A is inclined with the upper end 41b of the first surface 41a1 as a base point by the contact surface 11 such that the circumferential end portion 40x becomes closer to the fitting body 2 and the circumferential center portion 40y is moved away from the fitting body 2. Of course, instead of the contact surface 11, a contact surface 12 of the contact member 10 which faces the first surface 55a2 of the side wall portion 55 may be inclined with respect to the reference plane P.

Each of the above modifications can be similarly applied to the second embodiment. In the example shown in FIG. 15, an inclination mechanism 8B1 is configured such that a second surface 56a1 of each second protruding portion 56 is inclined with respect to the reference plane P and a second surface 49a1 of each side wall portion 49 is parallel to the reference plane P. In this case, the retaining ring 4B is inclined with an upper end 56b of the second surface 56a1 as a base point by the second surface 56a1 such that the circumferential end portion 40x becomes closer to the fitting body 2 and the circumferential center portion 40y is moved away from the fitting body 2.

Figure 16:
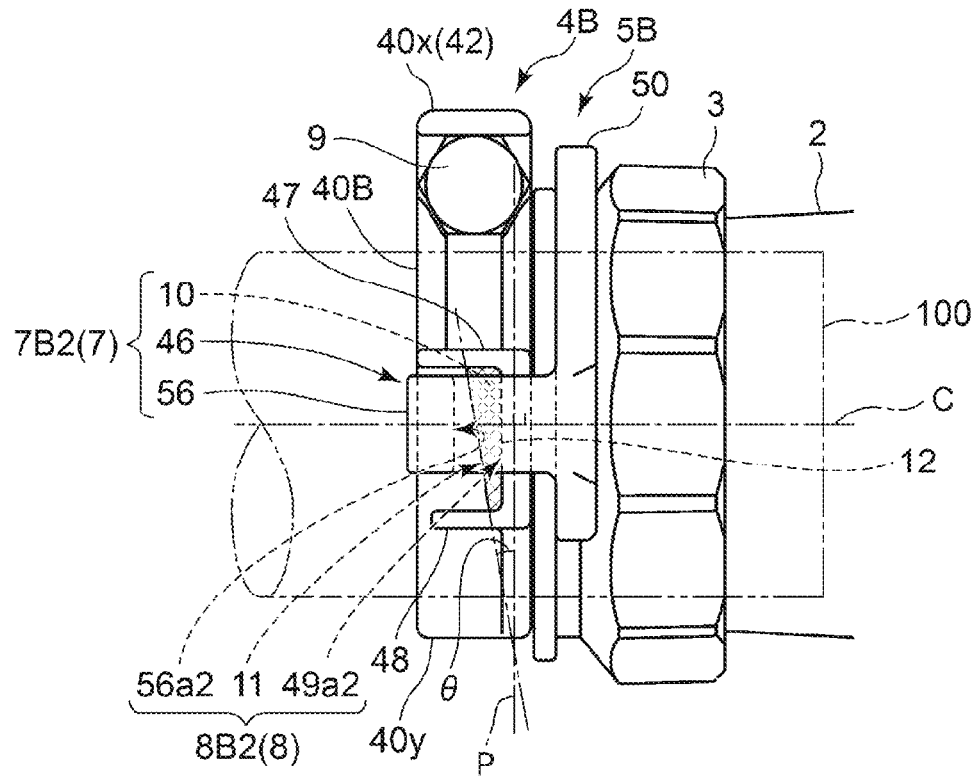
FIG. 16 is a side view showing another modification of the second embodiment.

Moreover, in the example shown in FIG. 16, a second surface 56a2 of each second protruding portion 56 and a second surface 49a2 of each side wall portion 49 are parallel to the reference plane P, a contact member 10 is interposed between these second surfaces 56a2 and 49a2, and an inclination mechanism 8B2 is configured by these second surfaces 56a2 and 49a2 and the contact member 10. A contact surface 11 of the contact member 10 which faces the second surface 56a2 of the second protruding portion 56 is inclined with respect to the reference plane P. Of course, also in this example, instead of the contact surface 11, a contact surface 12 of the contact member 10 may be inclined with respect to the reference plane P.

Figure 12B:
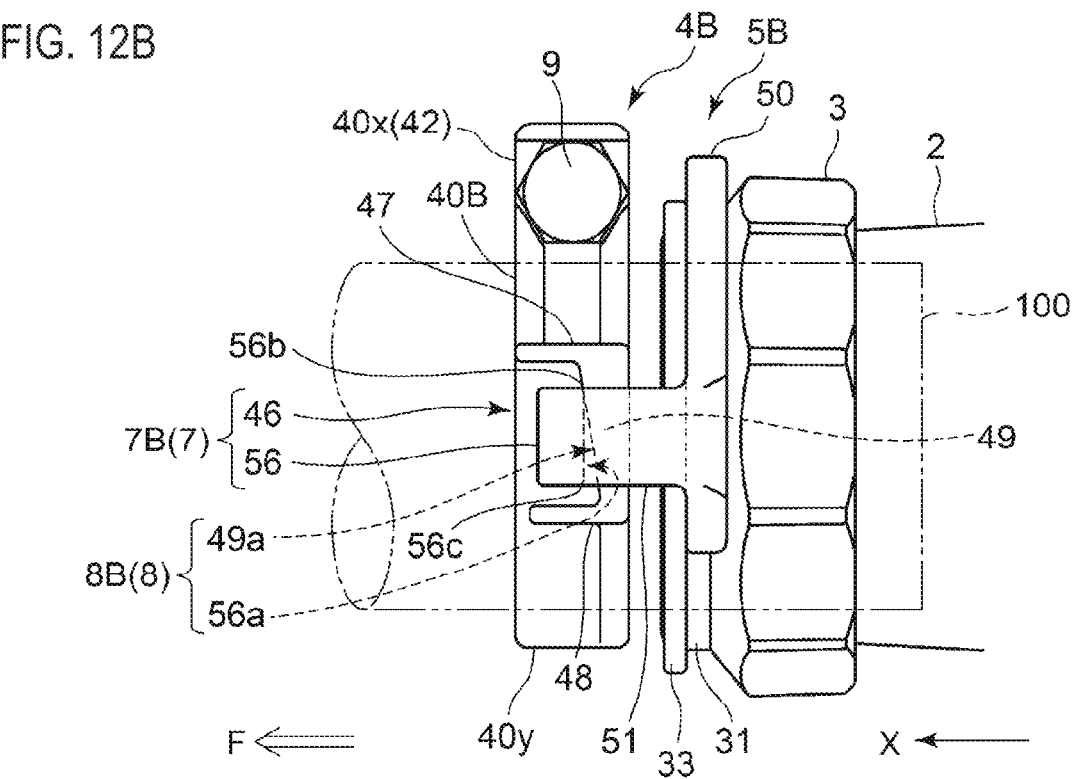
FIG. 12B is a diagram corresponding to FIG. 6B in the second embodiment.
Figure 12C:
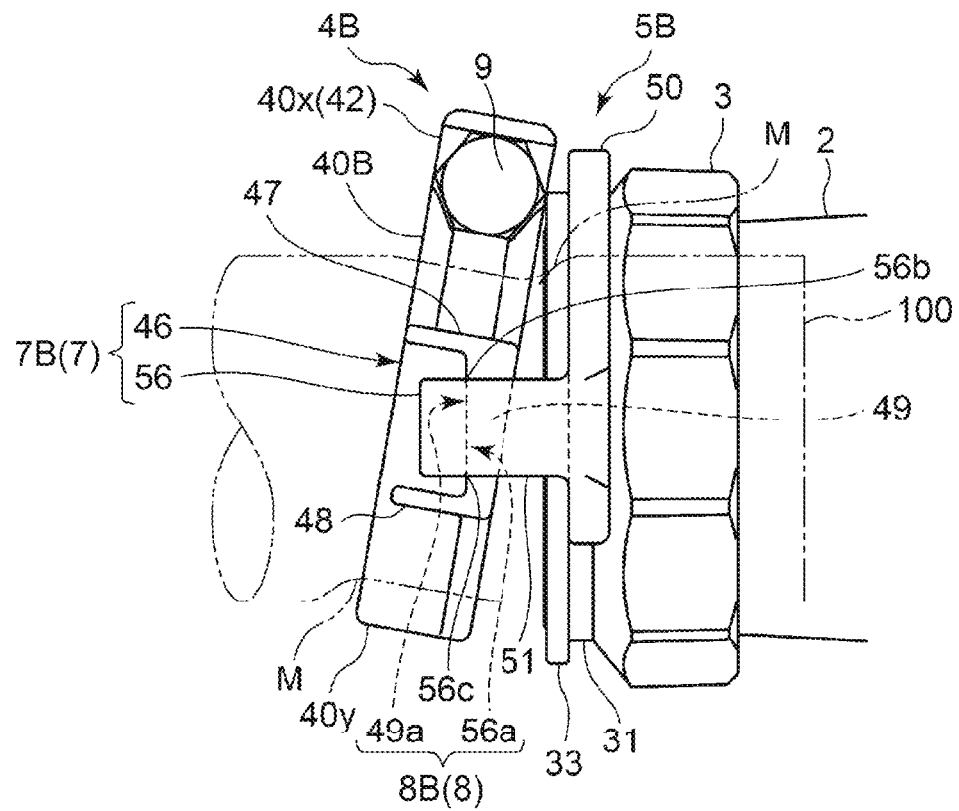
FIG. 12C is a diagram corresponding to FIG. 6C in the second embodiment.

In the above first and second embodiments and each of the above modifications, the inclination mechanism 8 inclines the retaining ring 4 in the pipe axis direction X with respect to the reference plane P orthogonal to the central axis C of the retaining ring body 40, such that the circumferential end portion 40x of the retaining ring body 40 becomes closer to the fitting body 2 and the circumferential center portion 40y is moved away from the fitting body 2 (FIG. 6C and FIG. 12C). However, when the joint pipe 100 is a low-density polyethylene pipe (PE50), the inclination mechanism 8 is not limited thereto.

Figure 15:
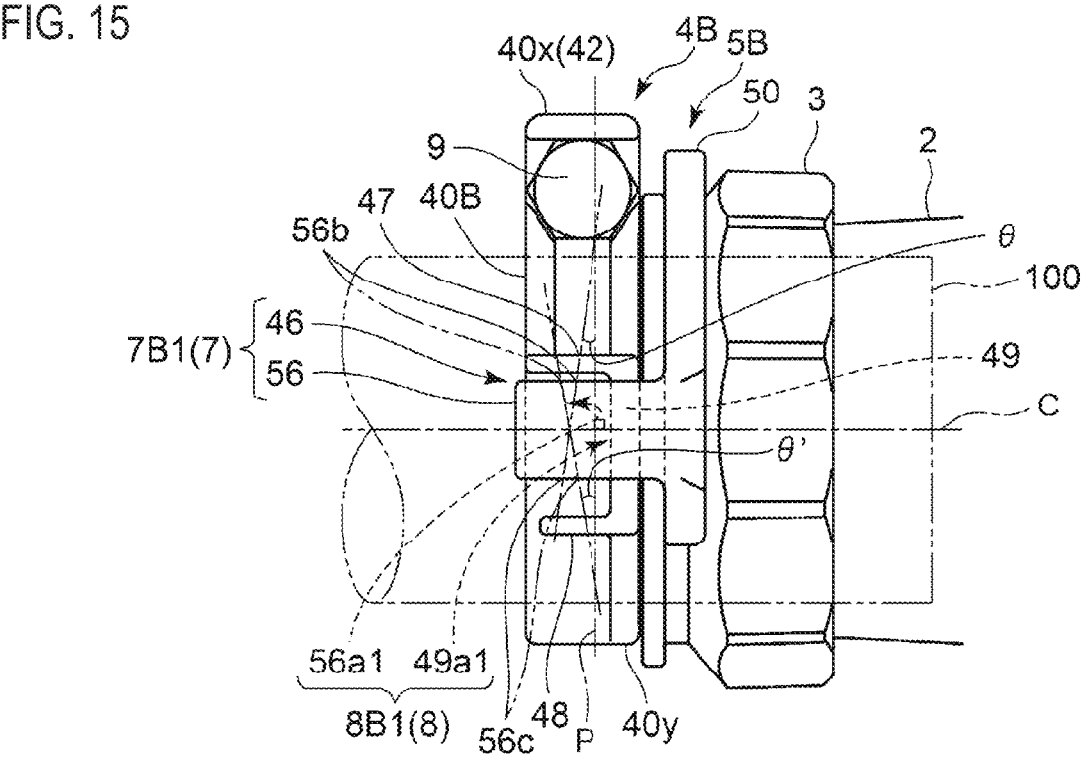
FIG. 15 is a side view showing a modification of the second embodiment.

In this case, for example, in each modification, the first surface 55a1, the contact surface 11, and the second surface 56a1 may be inclined at an inclination angle θ with respect to the reference plane P as shown by an alternate long and two short dashes line in FIGS. 13 to 15. Accordingly, the retaining ring 4A, 4B can be inclined with the lower end 41c of the first surface 41a1 or the lower end 56c of the second surface 56a1 as a base point by the first surface 55a1, contact surface 11, or the second surface 56a such that the circumferential center portion 40y becomes closer to the fitting body 2 and the circumferential end portion 40x is moved away from the fitting body 2.

Figure 17A:
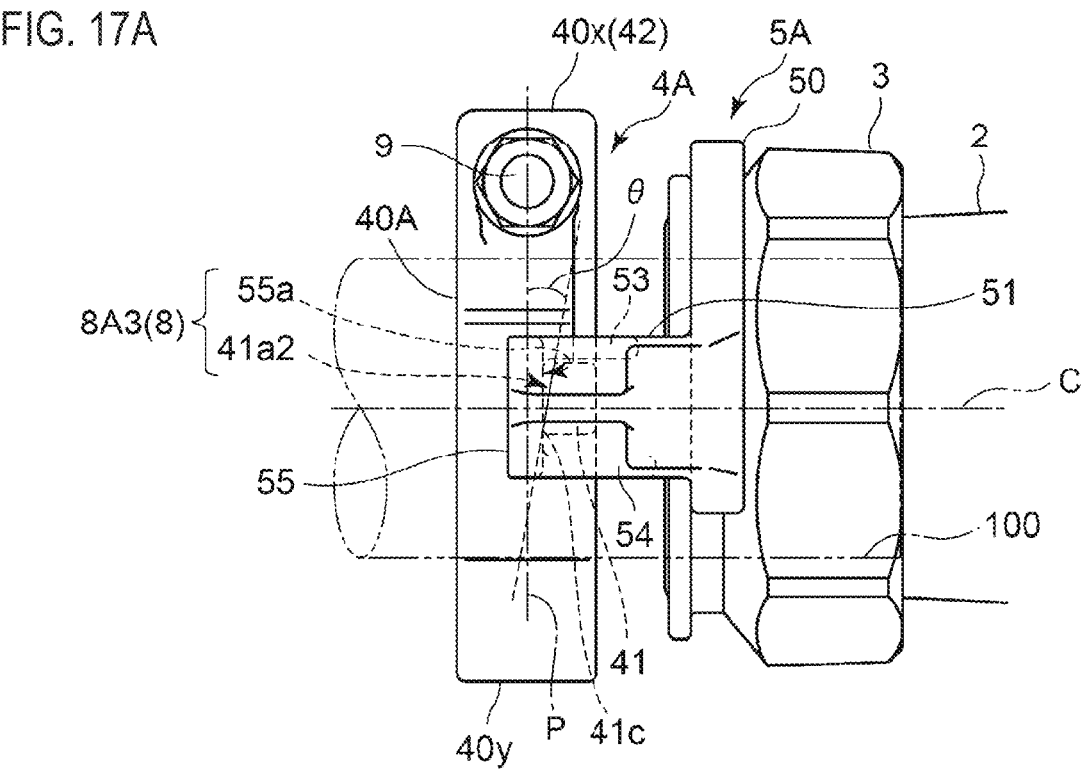
FIG. 17A is a diagram corresponding to FIG. 6B and showing still another modification of the first embodiment.
Figure 17B:
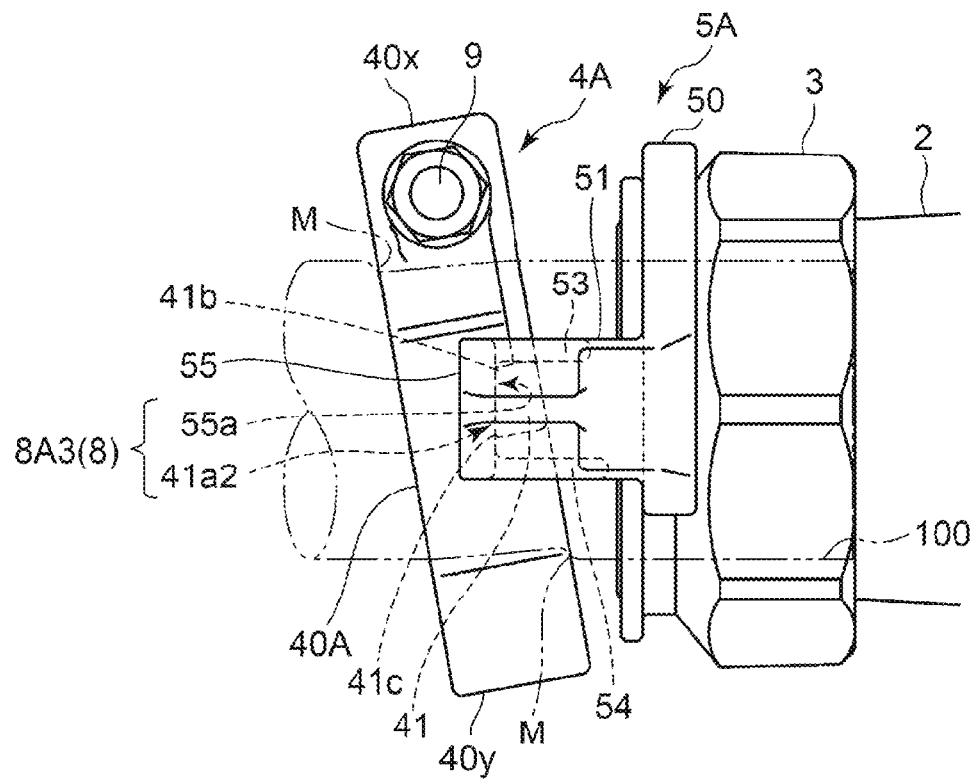
FIG. 17B is a diagram corresponding to FIG. 6C and showing the still another modification of the first embodiment.

In the case where the joint pipe 100 is a low-density polyethylene pipe (PE50), a modification of the first embodiment shown in FIGS. 17A and 17B can be applied. In this case, the first surface 41a2 of each first protruding portion 41 is inclined toward the union nut 3 side at an inclination angle θ with respect to the reference plane P. Accordingly, as shown in FIG. 17B, the retaining ring 4A can be inclined with the lower end 41c as a base point by the first surface 41a2 (inclination mechanism 8A3) such that the circumferential center portion 40y becomes closer to the fitting body 2 and the circumferential end portion 40x is moved away from the fitting body 2. Similar to the above first embodiment, detachment of the pipe is prevented by the biting of the retaining ring 4A and the blade portions 43 into the pipe.

Figure 18A:
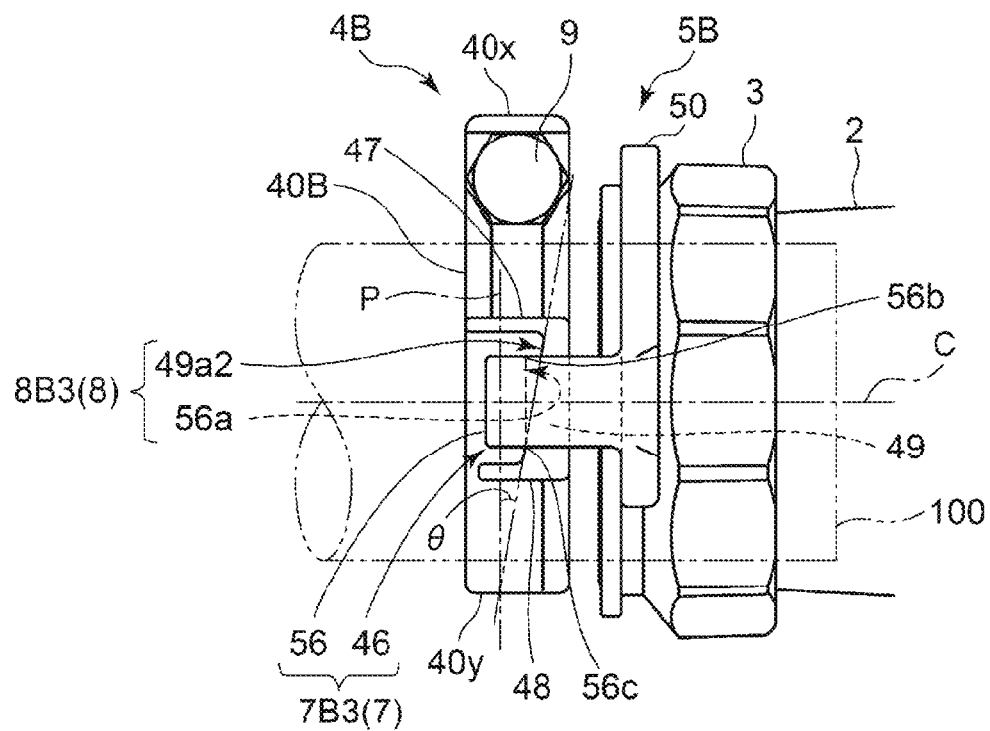
FIG. 18A is a diagram corresponding to FIG. 6B and showing still another modification of the second embodiment.
Figure 18B:
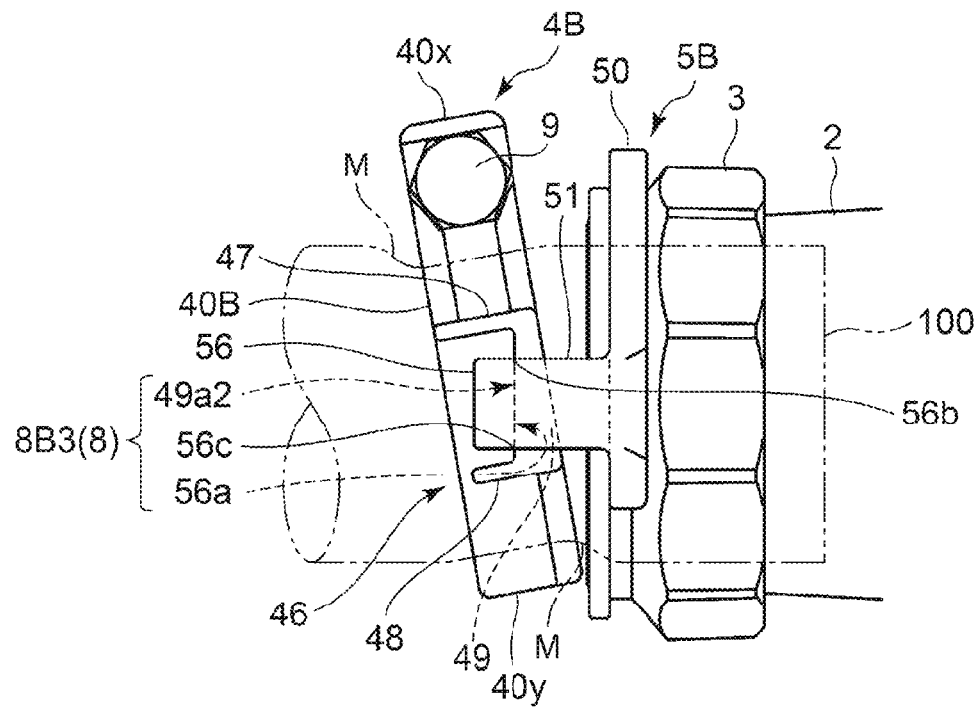
FIG. 18B is a diagram corresponding to FIG. 6C and showing the still another modification of the second embodiment.

In the case where the joint pipe 100 is a low-density polyethylene pipe (PE50), a modification of the second embodiment shown in FIGS. 18A and 18B can be applied. In this case, the side wall portion 49 of each second receiving portion 46 is inclined toward the union nut 3 side at an inclination angle θ with respect to the reference plane P. Accordingly, as shown in FIG. 18B, the retaining ring 4B is inclined with the lower end 56c as a base point by the second surface 49a2 (inclination mechanism 8B3) such that the circumferential center portion 40y becomes closer to the fitting body 2 and the circumferential end portion 40x is moved away from the fitting body 2. Similar to the second embodiment, detachment of the pipe is prevented by the biting of the retaining ring 4B and the blade portions 43 into the pipe.

Figure 19:
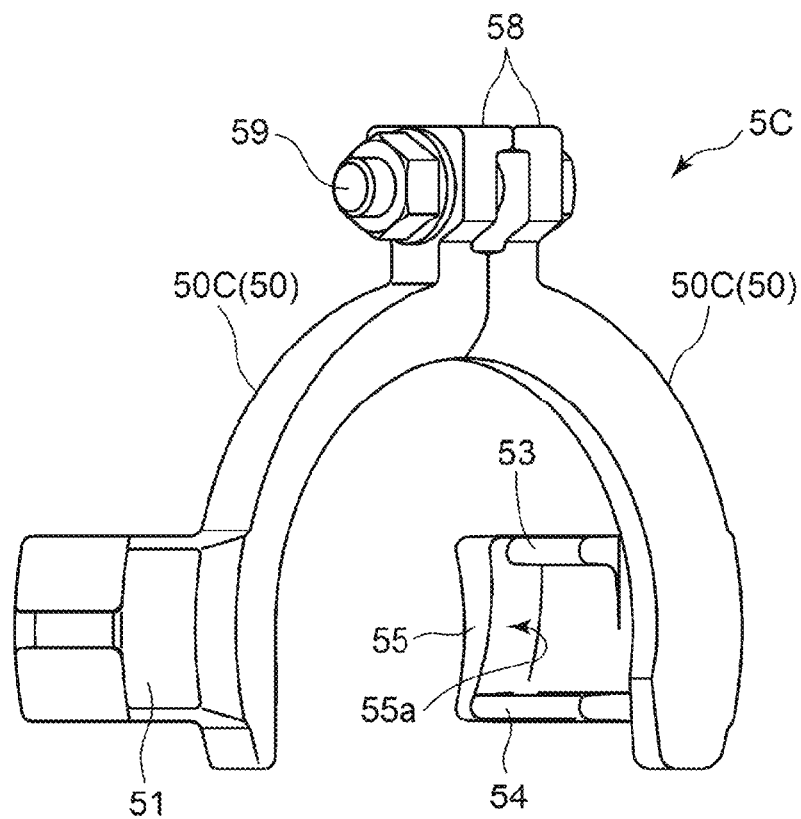
FIG. 19 is a perspective view showing a modification of the locking tool.

Moreover, in each of the above embodiments, in the locking tool 5, the main body 50 is formed in a horseshoe shape. However, it is possible to use a locking tool 5C in which, as shown in FIG. 19, a pair of bilaterally symmetrical body pieces 50C, 50C are connected and fixed at end portions 58 by connecting means 59 such as a bolt.

Figure 20:
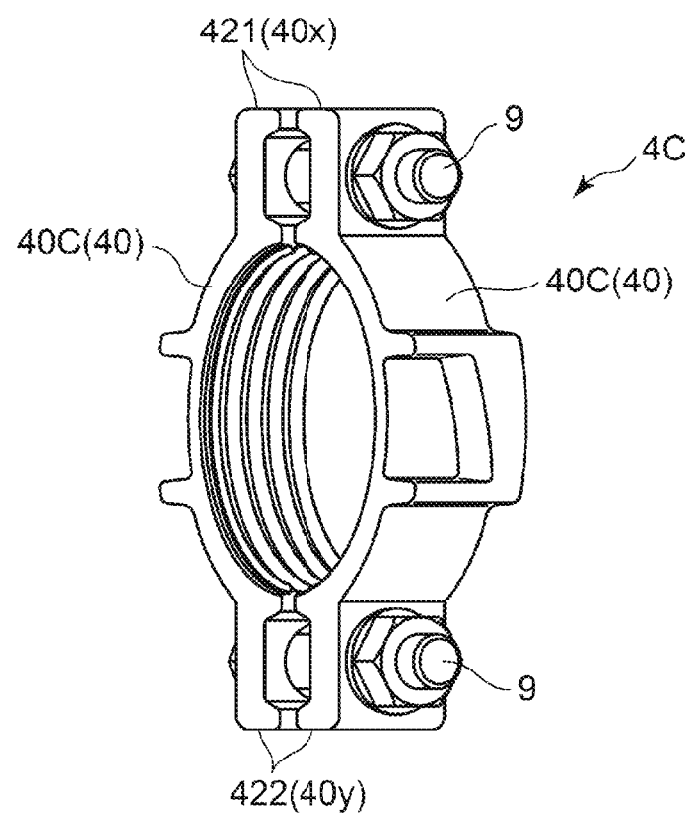
FIG. 20 is a perspective view showing a modification of the retaining ring.

In each of the above embodiments, in the retaining ring 4, the retaining ring body 40 is formed in a C-shaped ring shape. However, it is possible to use a retaining ring 4C in which, as shown in FIG. 20, a pair of bilaterally symmetrical body pieces 40C, 40C are connected and fixed at both end portions 421 and 422 by the tightening means 9 such as a bolt.

Moreover, in each of the above embodiments, the description has been given with the low-density polyethylene pipe (PE50) (nominal diameter: 13 to 50), which is a polyethylene pipe for water supply, as an example of the joint pipe 100. The joint pipe 100 is not limited to one for water supply, and can be applied to a general-purpose polyethylene pipe (type 1, PE50) (nominal diameter: 13 to 100). In addition, the material of the joint pipe 100 is not limited to polyethylene. However, since it is necessary to cause the blade portions 43 to bite by reducing the diameter of the retaining ring body 40 by the tightening means 9, a flexible material such as a polyethylene pipe can be more preferably used.

Figure 21A:
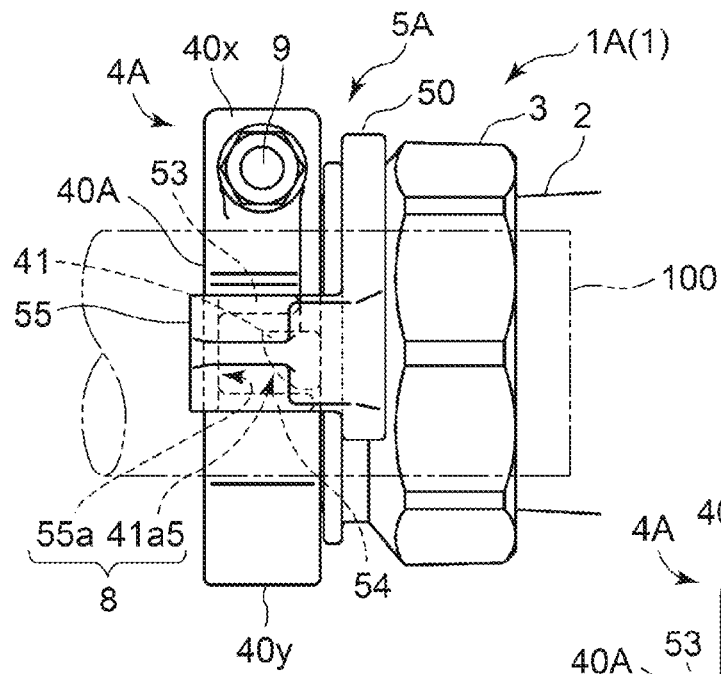
FIG. 21A to 21C are diagrams corresponding to FIG. 2 and showing still another modification of the first embodiment.
Figure 21B:
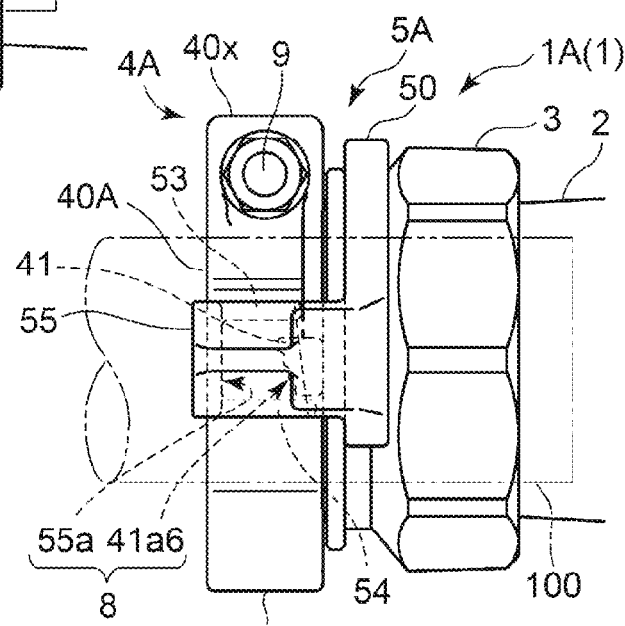
Figure 21C:
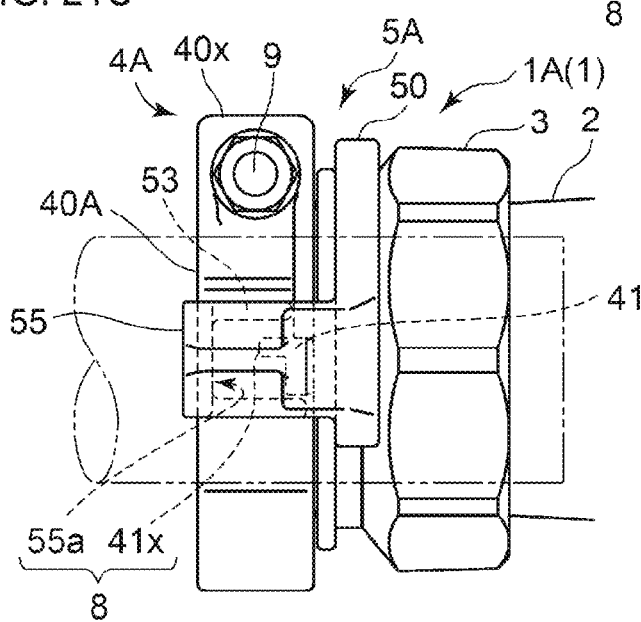
Figure 22A:
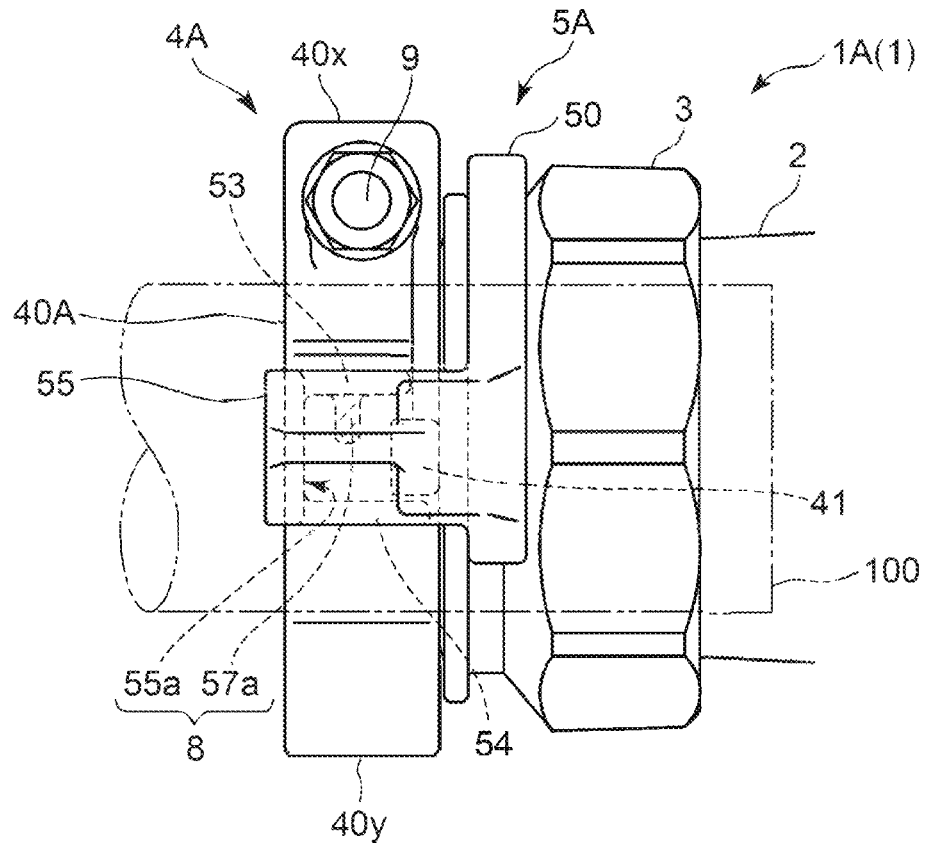
FIGS. 22A and 22B are diagrams corresponding to FIG. 2 and showing still another modification of the first embodiment.
Figure 22B:
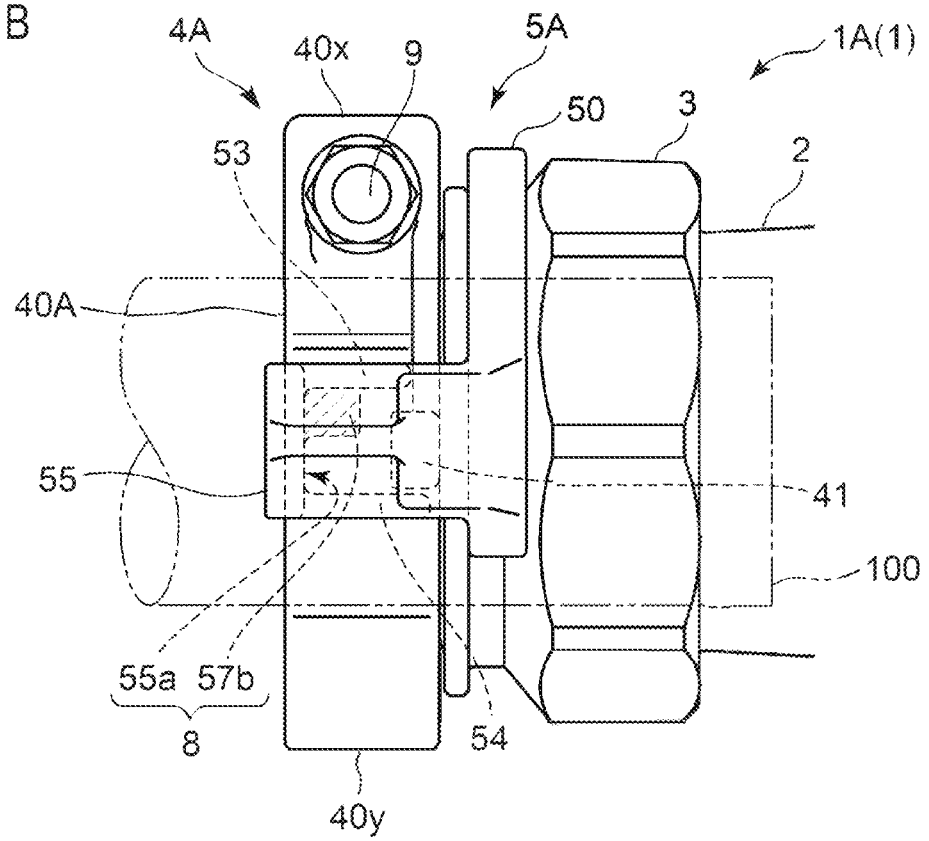
Figure 23:
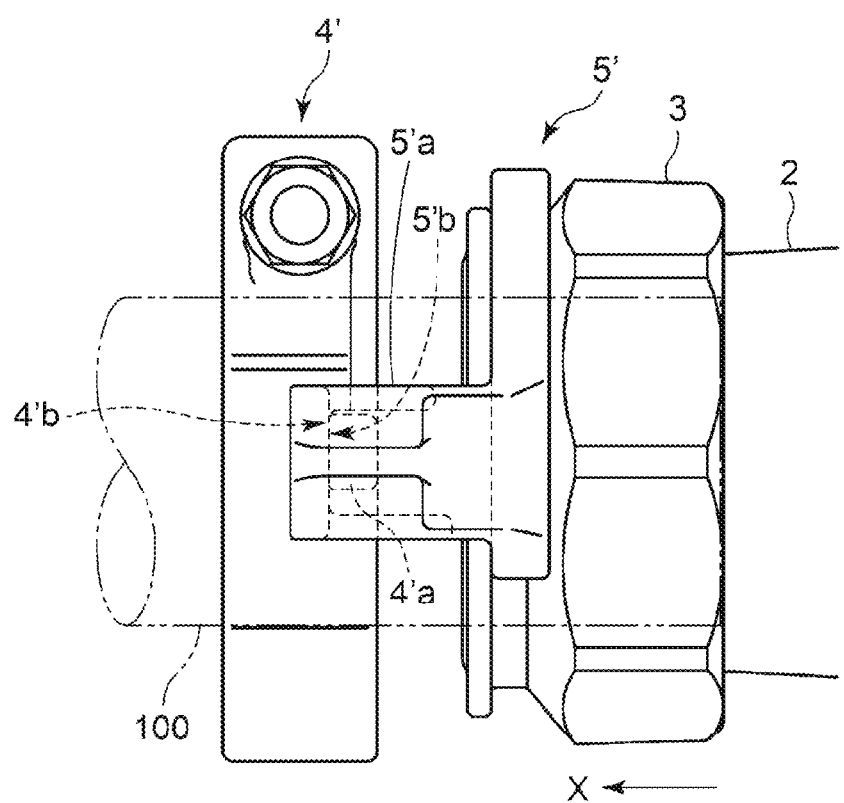
FIG. 23 is a side view showing a conventional pipe detachment preventing device.

In each of the above embodiments and modifications, in the inclination mechanism 8, the entirety of either one of the first surfaces 41a and 55a of the first protruding portion 41 and the first facing portion 55, which come into contact with each other, or the entirety of either one of the second surfaces 56a and 49a of the second protruding portion 56 and the second facing portion 49, which come into contact with each other, is formed as a flat inclined surface. However, the inclination mechanism 8 is not limited thereto, and, for example, instead of the flat inclined surface, a curved surface 41a5 or a stepped surface portion 41a6 may be formed as shown in FIG. 21(a) or (b). In addition, a part of any one of the first surfaces 41a and 55a and the second surfaces 56a and 49a may be formed as an inclined surface, a curved surface, or the like, or as shown in FIG. 21(c), a protruding portion 41x protruding toward the facing surface may be provided. In these examples, the retaining ring 4 is inclined with an end portion of the curved surface 41a5 or the stepped surface portion 41a6 or the protruding portion 41x as a base point. Moreover, as shown in FIG. 22(a) or (b), the retaining ring 4 can also be similarly inclined when a protruding portion 57a or 57b is provided at any one of the upper and lower wall portions 53 and 54 of the first receiving portion 52 and the upper and lower wall portions 47 and 48 of the second receiving portion 46. Of course, FIGS. 21 and 22 show modifications of the first embodiment, but the same configuration can also be applied to the second embodiment. As described above, the inclination mechanism 8 may have a configuration (mechanism) capable of inclining the retaining ring 4 when one member comes into contact with another member and a pipe pulling force which stretches the joint pipe 100 is applied.

It should be noted that, in each of the above embodiments, an inner core is omitted, but the present invention can also be applied to the case of using an inner core. In this case, diameter reduction of the joint pipe 100 and deformation of the pipe are suppressed by the inner core, but the inclination mechanism 8 serves to cause the blade portions 43 to bite into the joint pipe 100, so that the linear connection between the retaining ring 4 and the fitting body 2 is maintained without the joint pipe 100 being displaced, and the prevention of detachment of the pipe is not affected. That is, the present invention can be used (shared) regardless of whether or not the inner core is used, and the versatility is extremely high.

In each of the above embodiments, the description has been given with the polyethylene double-layer pipe for water supply (type 1, low-density polyethylene pipe (PE50)) as an example of the joint pipe 100. However, even if the joint pipe 100 is a high-performance polyethylene pipe (also referred to as "Higher Performance Polyethylene", commonly known as "HPPE", or "third generation high-density polyethylene pipe" (PE100)), the present invention can be applied.

However, since the high-performance polyethylene pipe (PE100) is denser and harder than the low-density polyethylene pipe (PE50), the high-performance polyethylene pipe is not stretched and does not become thinner (not reduced in diameter) when the water pressure is low or not applied, and the inclination mechanism 8 does not function. On the other hand, in a state of the use water pressure or test water pressure (normal use state), the inclination mechanism 8 functions when a large pulling force is applied to the high-performance polyethylene pipe. As described above, in the case of the high-performance polyethylene pipe (PE100), the action of the inclination mechanism 8 is different from that in each embodiment (low-density polyethylene pipe (PE50)) described above.

Here, PE100 refers to a pipe for which the 97.5% confidence lower limit of a long-term hydrostatic strength obtained by the method specified in ISO 9080 is 10.00 to 11.29 MPa, and is classified as one having minimum required strength (MRS)=10.0 MPa.

In the case where the joint pipe 100 in the pipe detachment preventing device 1A of the first embodiment is a high-performance polyethylene pipe, in a state of the use water pressure or test water pressure (normal use state) as shown in FIG. 6B, when the pipe pulling force F is applied in a state where the upper end 41*b* of each first surface 41*a* of the retaining ring 4A is in contact with the side wall portion 55 of the locking tool 5A, as shown in FIG. 6C, the retaining ring 4A is inclined with the upper end 41*b* as a base point by the first surface 41*a* such that the circumferential end portion 40*x* becomes closer to the fitting body 2 and the circumferential center portion 40*y* is moved away from the fitting body 2. Then, the retaining ring body 40A comes into contact with and bites into the high-performance polyethylene pipe at two locations on the upper side and the lower side to deform (bend) the high-performance polyethylene pipe. A deformed portion M formed in the high-performance polyethylene pipe opposes the pipe pulling force F and greatly improves the detachment preventing force for the pipe. In addition, since the high-performance polyethylene pipe is relatively hard and is less likely to be deformed, the biting of the blade portions 43 is weaker on the circumferential center portion 40*y* side, which is away from the tightening means 9, than on the circumferential end portion 40*x* side. Due to the inclination of the retaining ring 4A, the blade portions 43 at the circumferential center portion 40*y* further bite into the high-performance polyethylene pipe, so that the detachment preventing force for the pipe is further improved.

Moreover, in the case of a high-performance polyethylene pipe, since the retaining ring 4A bites into the high-performance polyethylene pipe on the circumferential end portion 40*x* side, on which the tightening means 9 is located, more than in the vicinity of the circumferential center portion 40*y*, the pipe pulling force F is likely to be generated on the circumferential end portion 40*x* side. Therefore, by inclining the retaining ring 4A with the upper end 41*b* as a base point, the retaining ring 4A can be relatively easily inclined to form the deformed portion M in the high-performance polyethylene pipe, so that the detachment preventing force for the pipe can be further improved.

Moreover, in the case where the joint pipe 100 in the pipe detachment preventing device 1B of the second embodiment is a high-performance polyethylene pipe, in a state of the use water pressure or test water pressure (normal use state) as shown in FIG. 12B, when the pipe pulling force F is applied in a state where the upper end 56*b* of each second surface 56*a* of the locking tool 5B is in contact with the side wall portion 49 of the retaining ring 4B, as shown in FIG. 12C, the retaining ring 4B is inclined with the upper end 56*b* as a base point by the second surface 56*a* such that the circumferential end portion 40*x* becomes closer to the fitting body 2 and the circumferential center portion 40*y* is moved away from the fitting body 2. Then, the retaining ring body 40B comes into contact with and bites into the high-performance polyethylene pipe at two locations on the upper side and the lower side to deform (bend) the high-performance polyethylene pipe. A deformed portion M formed in the high-performance polyethylene pipe opposes the pipe pulling force F and greatly improves the detachment preventing force for the pipe. In addition, due to the inclination of the retaining ring 4B, the blade portions 43 at the circumferential center portion 40*y* further bite into the high-performance polyethylene pipe, so that the detachment preventing force for the pipe is further improved.

As described above, in the case where the joint pipe 100 is a high-performance polyethylene pipe (PE100), when a large pulling force is generated at the pipe in a state of the use water pressure or test water pressure (normal use state), the retaining ring 4 is inclined by the inclination mechanism 8 of the present invention to deform (bend) the high-performance polyethylene pipe and oppose the pipe pulling force F, so that the detachment preventing force for the pipe can be greatly improved.

Moreover, in the case where the joint pipe 100 is a high-performance polyethylene pipe (PE100), the inclination angle θ is preferably not less than 1° and not greater than 4°. If the inclination angle is greater than this, the blade portions 43 may excessively bite on the circumferential center portion 40*y* side, and the pipe may be broken. On the other hand, if the inclination angle is less than 1°, the inclination may become insufficient, so that it may be impossible to oppose a large pipe pulling force F. The inclination angle θ is further preferably not less than 2° and not greater than 3°.

It should be noted that, also in each of the modifications of the first and second embodiments described above, in the case where the joint pipe 100 is a high-performance polyethylene pipe (PE100), similarly to the above, the inclination mechanism 8 opposes the pipe pulling force F and greatly improves the detachment preventing force for the pipe. However, in the case of a high-performance polyethylene pipe, the retaining ring 4 bites into the high-performance polyethylene pipe on the circumferential end portion 40*x* side, on which the tightening means 9 is located, more than in the vicinity of the circumferential center portion 40*y*. Therefore, a mode in which the circumferential end portion 40*x* of the retaining ring 4 is caused to be closer to the fitting body 2 and the circumferential center portion 40*y* is moved away from the fitting body 2 is preferable for the inclination mechanism 8, rather than a mode in which the circumferential center portion 40*y* of the retaining ring 4 is caused to be closer to the fitting body 2 and the circumferential end portion 40*x* is moved away from the fitting body 2 (for example, the inclination shown by an alternate long and two short dashes line in FIGS. 13 to 15 (an inclination angle θ' with respect to the reference plane P) and the modifications shown in FIGS. 17A, 17B, 18A and 18B).

DESCRIPTION OF THE REFERENCE CHARACTERS

1 pipe detachment preventing device
2 fitting body 3 union nut
4 retaining ring
5 locking tool
6 rubber packing
7 connection holding means
8 inclination mechanism
9 tightening means
9a bolt
9b nut
10 contact member
11, 12 contact surface
21 receiving portion
22 external thread
31 fitting groove
32 internal tread
33 flange
40 retaining ring body
40C body piece
40x circumferential end portion
40y circumferential center portion
41 first protruding portion
41a first surface
41b upper end
41c lower end
41d upper portion
41e lower portion
41x protruding portion
42 projecting piece
421, 422 end portion
43 blade portion
44 slit
45 bifurcated portion
46 second receiving portion
47 upper wall portion
48 lower wall portion
49 side wall portion (second facing portion)
49a second surface
50 main body
50C body piece
51 arm portion
52 first receiving portion
53 upper wall portion
54 lower wall portion
55 side wall portion (first facing portion)
55a first surface
56 second protruding portion
56a second surface
56b upper end
56c lower end
57a, 57b protruding portion
59 connecting means
100 joint pipe
C central axis
F pipe pulling force (load)
L center line
M deformed portion
N horizontal plane
O center
P reference plane
X pipe axis direction
θ inclination angle

The invention claimed is:

1. A pipe detachment preventing device for a union nut pipe fitting, comprising: a fitting body having a receiving portion which has an external thread formed on an outer peripheral surface thereof and into which a non-threaded joint pipe is inserted; a union nut screwed and tightened to the receiving portion with an annular rubber packing interposed therebetween; a retaining ring fixed to an outer peripheral surface of the joint pipe by reducing a diameter of a retaining ring body by tightening means; a locking tool detachably attached to the union nut; and connection holding means configured to hold connection between the retaining ring and the locking tool, wherein
the retaining ring includes a pair of first protruding portions protruding outward from the retaining ring body, and a blade portion which is provided on an inner side of the retaining ring body and which bites into the joint pipe due to diameter reduction by the tightening means,
the locking tool includes a pair of first facing portions which are provided at a pair of arm portions extending along an axial direction from a main body and which face the first protruding portions in a pipe axis direction, and
the connection holding means includes an inclination mechanism configured to incline the retaining ring in the pipe axis direction with respect to a reference plane orthogonal to a central axis of the retaining ring body, such that one of a circumferential center portion or a circumferential end portion of the retaining ring body is caused to be closer to the fitting body and the other is moved away from the fitting body, when the first protruding portions and the first facing portions come into contact with each other and a pipe pulling force which stretches the joint pipe is applied to the joint pipe.

2. The pipe detachment preventing device for a union nut pipe fitting according to claim 1, wherein the inclination mechanism includes a first surface of each first protruding portion which faces the first facing portion, and a first surface of each first facing portion which faces said first surface, and either one of the first surfaces is inclined in the pipe axis direction with respect to the reference plane.

3. The pipe detachment preventing device for a union nut pipe fitting according to claim 1, wherein
the inclination mechanism includes a first surface of each first protruding portion which faces the first facing portion, a first surface of each first facing portion which faces said first surface, and a contact member interposed between the first surface of each first protruding portion and the first surface of each first facing portion, and
either one of contact surfaces of the contact member that comes into contact with one of the first surfaces is inclined in the pipe axis direction with respect to the reference plane.

4. The pipe detachment preventing device for a union nut pipe fitting according to claim 1, wherein the inclination mechanism causes the circumferential end portion to be closer to the fitting body and moves the circumferential center portion away from the fitting body.

5. The pipe detachment preventing device for a union nut pipe fitting according to claim 1, wherein, in the retaining ring body, an inner diameter of the blade portion is reduced to be 97% or less of an outer diameter of the joint pipe by the tightening means.

6. The pipe detachment preventing device for a union nut pipe fitting according to claim 1, wherein the joint pipe is a low-density polyethylene pipe (LLDPE/PE50).

7. The pipe detachment preventing device for a union nut pipe fitting according to claim 1, wherein the joint pipe is a high-performance polyethylene pipe (HPPE/PE100).

8. A pipe detachment preventing device for a union nut pipe fitting, comprising: a fitting body having a receiving portion which has an external thread formed on an outer peripheral surface thereof and into which a non-threaded joint pipe is inserted; a union nut screwed and tightened to the receiving portion with an annular rubber packing interposed therebetween; a retaining ring fixed to an outer peripheral surface of the joint pipe by reducing a diameter of a retaining ring body by tightening means; a locking tool detachably attached to the union nut; and connection holding means configured to hold connection between the retaining ring and the locking tool, wherein the locking tool includes a pair of second protruding portions protruding inward at end portions of a pair of arm portions extending along a pipe axis direction from a main body, the retaining ring includes a pair of second facing portions which are provided on an outer peripheral surface of the retaining ring body and which face the second protruding portions, and a blade portion which is provided on an inner side of the retaining ring body and which bites into the joint pipe due to diameter reduction by the tightening means, and the connection holding means includes an inclination mechanism configured to incline the retaining ring in the pipe axis direction with respect to a reference plane orthogonal to a central axis of the retaining ring body, such that one of a circumferential center portion or a circumferential end portion of the retaining ring body is caused to be closer to the fitting body and the other is moved away from the fitting body, when the second protruding portions and the second facing portions come into contact with each other and a pipe pulling force which stretches the joint pipe is applied to the joint pipe.

9. The pipe detachment preventing device for a union nut pipe fitting according to claim 8, wherein the inclination mechanism includes a second surface of each second protruding portion which faces the second facing portion, and a second surface of each second facing portion which faces said second surface, and either one of the second surfaces is inclined in the pipe axis direction with respect to the reference plane.

10. The pipe detachment preventing device for a union nut pipe fitting according to claim 8, wherein the inclination mechanism includes a second surface of each second protruding portion which faces the second facing portion, a second surface of each second facing portion which faces said second surface, and a contact member interposed between the second surface of each second protruding portion and the second surface of each second facing portion, and either one of contact surfaces of the contact member that comes into contact with one of the second surfaces is inclined in the pipe axis direction with respect to the reference plane.

11. The pipe detachment preventing device for a union nut pipe fitting according to claim 8, wherein the inclination mechanism causes the circumferential end portion to be closer to the fitting body and moves the circumferential center portion away from the fitting body.

12. The pipe detachment preventing device for a union nut pipe fitting according to claim 8, wherein, in the retaining ring body, an inner diameter of the blade portion is reduced to be 97% or less of an outer diameter of the joint pipe by the tightening means.

13. The pipe detachment preventing device for a union nut pipe fitting according to claim 8, wherein the joint pipe is a low-density polyethylene pipe (LLDPE/PE50).

14. The pipe detachment preventing device for a union nut pipe fitting according to claim 8, wherein the joint pipe is a high-performance polyethylene pipe (HPPE/PE100).

* * * * *